(12) United States Patent
Ojard

(10) Patent No.: US 7,830,995 B2
(45) Date of Patent: *Nov. 9, 2010

(54) MULTI-BAND SINGLE-CARRIER MODULATION

(75) Inventor: Eric J. Ojard, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 12/039,765

(22) Filed: Feb. 29, 2008

(65) Prior Publication Data

US 2009/0010367 A1  Jan. 8, 2009

Related U.S. Application Data

(63) Continuation of application No. 10/873,911, filed on Jun. 22, 2004, now Pat. No. 7,362,829.

(60) Provisional application No. 60/488,623, filed on Jul. 18, 2003, provisional application No. 60/494,498, filed on Aug. 12, 2003.

(51) Int. Cl.
*H04L 1/00* (2006.01)
*H04L 27/28* (2006.01)
*H04B 1/10* (2006.01)

(52) U.S. Cl. ............... 375/346; 375/136; 375/260; 375/316

(58) Field of Classification Search ............ 375/346
See application file for complete search history.

(56) References Cited

U.S. PATENT DOCUMENTS 5,396,657 A * 3/1995 Jokinen ............... 455/307
2005/0047444 A1 * 3/2005 Park et al. ............ 370/480

* cited by examiner

*Primary Examiner*—Shuwang Liu
*Assistant Examiner*—David Huang
(74) *Attorney, Agent, or Firm*—Garlick Harrison & Markison; Shayne X. Short

(57) ABSTRACT

Multi-band single-carrier modulation. A novel approach is presented by which interference compensation may be performed for signals received by a piconet operable device. The piconet operable device may be implemented within a region that includes two or more SOPs (Simultaneously Operating Piconets). Estimation of the level and location of interference is performed and the input to a decoder (within the piconet operable device) is selectively weighted to ensure that the effect of any existent interference within the signal received by the piconet operable device is minimized. Different interference levels are dealt with differently. For one example, portions of the received signal having undergone a large amount of interference may be simply treated as erasures with respect to the input the decoder. For another example, portions of the received signal having undergone some smaller degree of interference, but some interference nonetheless, may be de-weighted before being provided to the decoder.

20 Claims, 24 Drawing Sheets method for receive processing in a piconet operable device

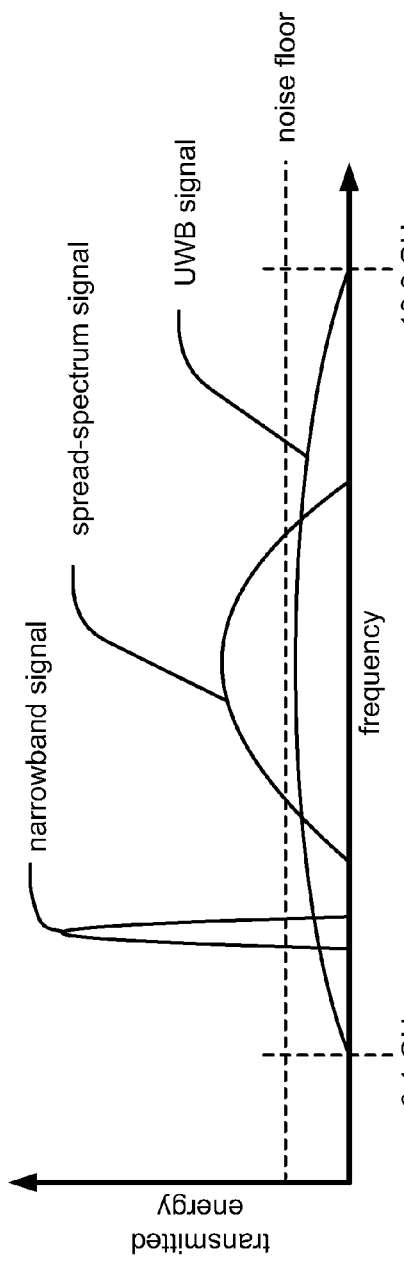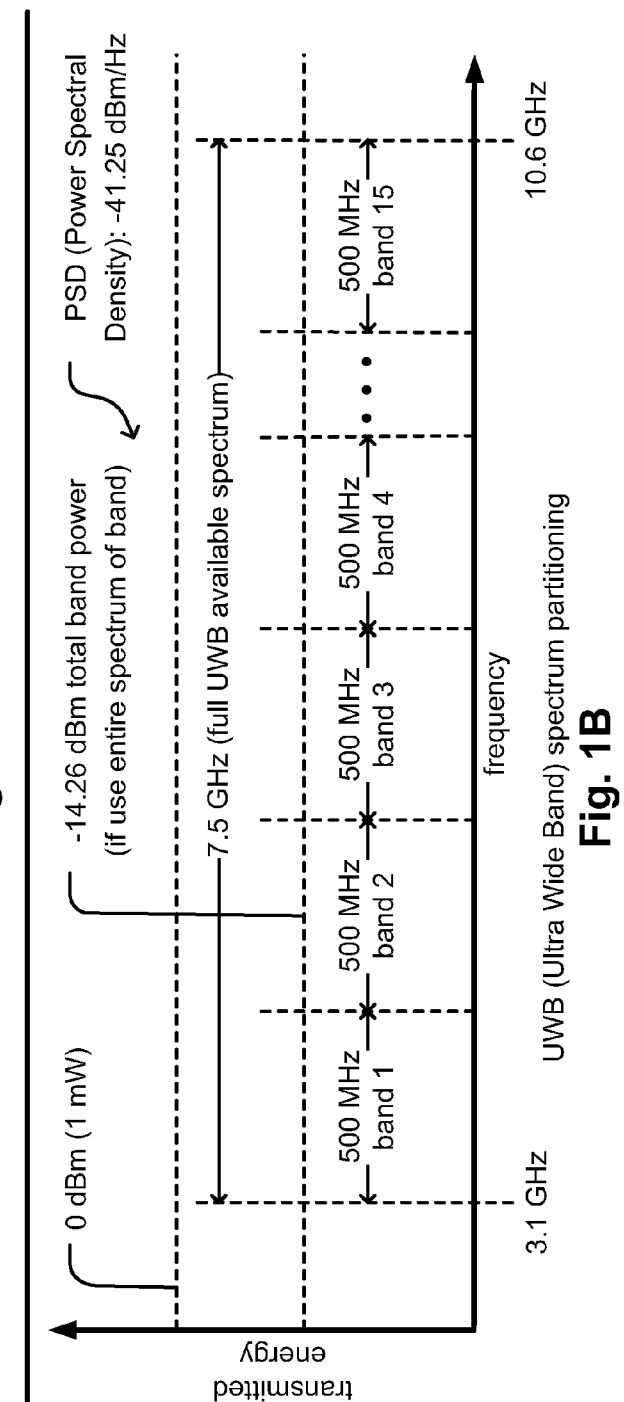

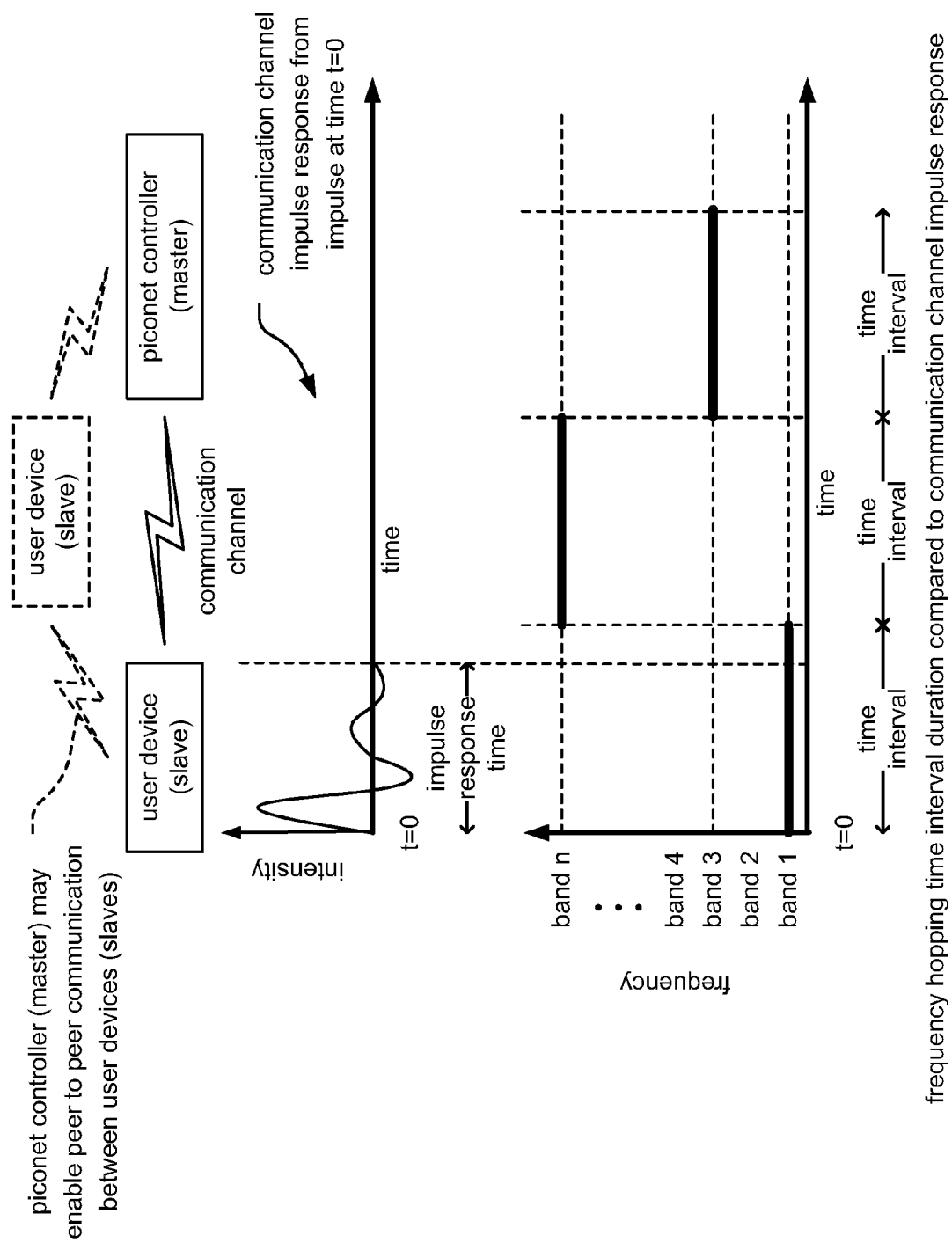

CDMA (Code Division Multiple Access)

SOPs (Simultaneously Operating Piconets) within relatively close proximity (having some overlap)

fast frequency hopping with multipath and interference

SH-OFDM (Slow Hopping-Orthogonal Frequency Division Multiplexing)

reduced duty cycle SH-OFDM (Slow Hopping-Orthogonal Frequency Division Multiplexing)

functionality of smart receiver functionality of interference compensation capitalizing on structured interference 3rd order elliptical LPF (Low Pass Filter) employed at transmitter and receiver (or a transceiver)

method for receive processing in a piconet operable device method for receive processing in a piconet operable device

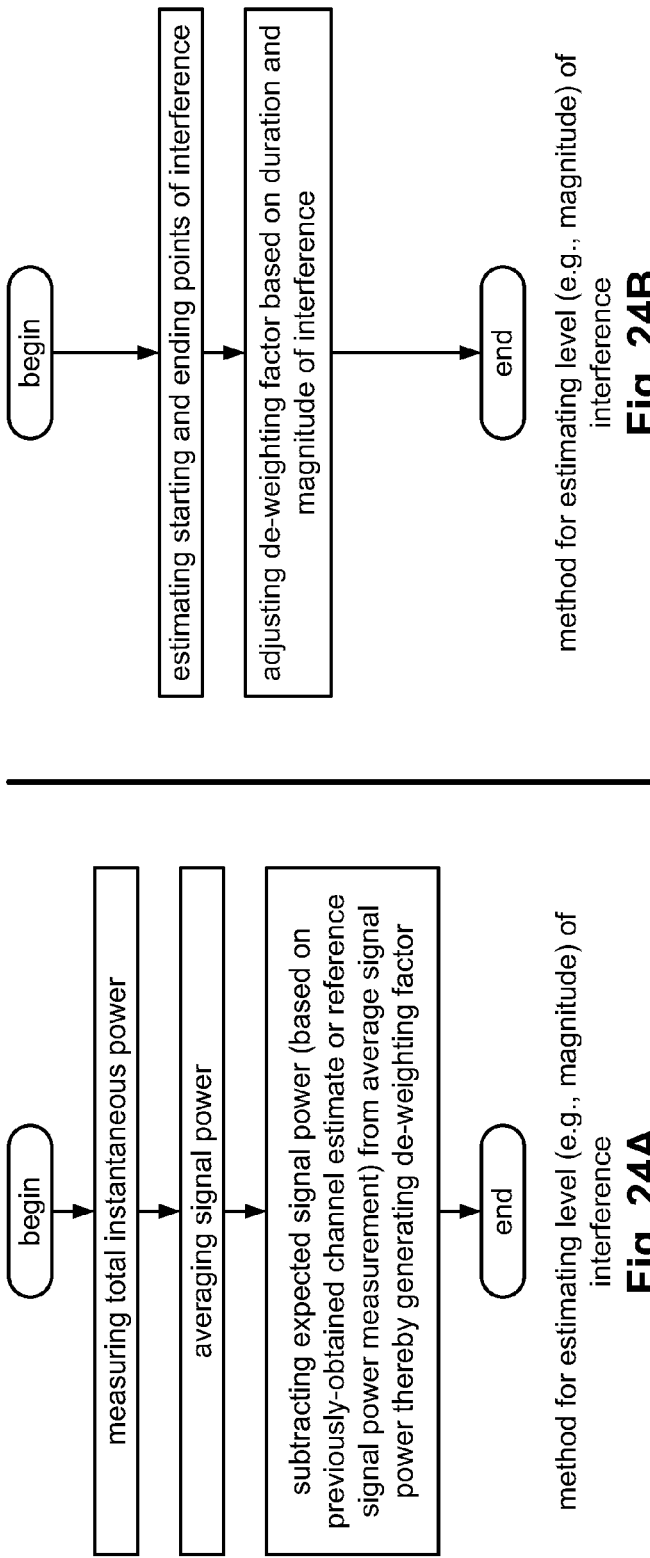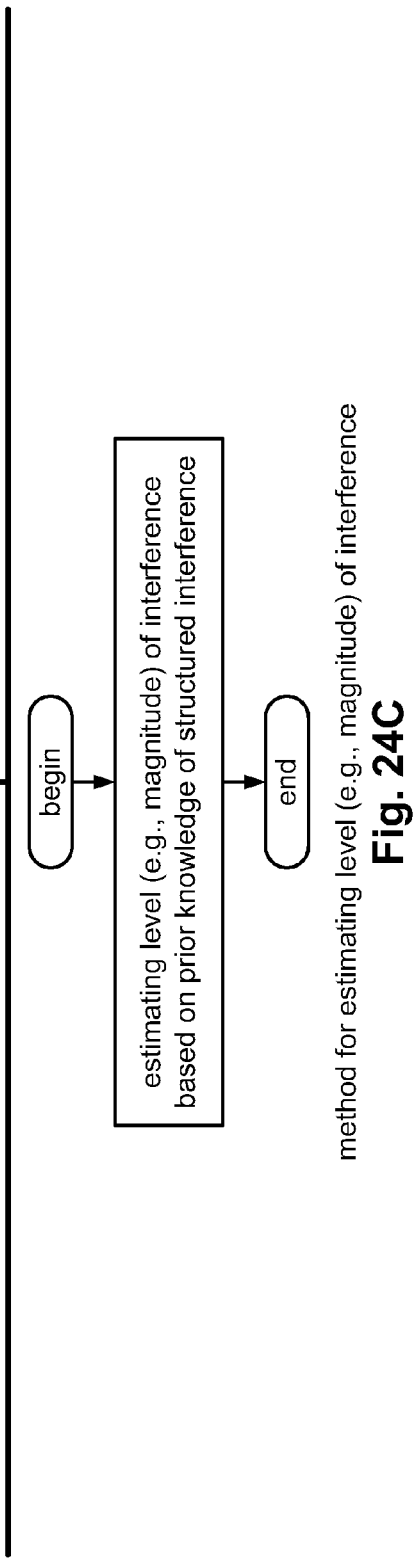

MULTI-BAND SINGLE-CARRIER MODULATION

CROSS REFERENCE TO RELATED PATENTS/PATENT APPLICATIONS

Continuation Priority Claim, 35 U.S.C. §120

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:

1. U.S. Utility application Ser. No. 10/873,911, entitled "Multi-band single-carrier modulation," filed 06-22-2004, pending, which claims priority pursuant to 35 U.S.C. §119(e) to the following U.S. Provisional Patent Applications which are hereby incorporated herein by reference in their entirety and made part of the present U.S. Utility patent application for all purposes:

a. U.S. Provisional Application Ser. No. 60/488,623, entitled "UWB (Ultra Wide Band) interference mitigation," filed 07-18-2003, now expired.

b. U.S. Provisional Application Ser. No. 60/494,498, entitled "Multi-band single-carrier modulation," filed 08-12-2003, now expired.

BACKGROUND OF THE INVENTION

1. Technical Field of the Invention

The invention relates generally to communication systems; and, more particularly, it relates to receive processing (demodulation and decoding) of signals received within such communication systems.

2. Description of Related Art

Data communication systems have been under continual development for many years. In recent years, the development of piconet type communication systems has been under increasing development. A piconet may be viewed as a network that is established when two devices connect to support communication of data between themselves. These piconets typically operate within a region having a radius of up to approximately 10 meters. Sometimes, piconets are referred to as PANs (Personal Area Networks), and those piconets that operate using wireless means are often referred to as WPANs (Wireless Personal Area Networks).

Piconets are often typically discussed in the context of wireless communication systems. Devices operating within the piconet typically operate according to an M/S (Master/Slave) type relationship. Some piconets also include multiple user devices (e.g., slave devices) that interact with a piconet controller (e.g., the master device). In even some other instances, two or more piconets operate such that they share at least one common device in a scatternet implementation. For example, in a scatternet, user devices (slave devices) may interact with two or more separate piconet controllers (master devices). This implementation allows various devices within different piconets that are located relatively far from one another to communicate through the corresponding piconet controllers (master devices) of the scatternet. However, within a scatternet implementation, a problem may arise such that each of the individual piconets must be able to operate in relative close proximity with other piconets without interfering with one another. It is also noted that independently operating piconets, not implemented within a scatternet implementation, may also suffer from deleterious effects of interference with other piconets located within relative close proximity. One such deleterious effect that may arise is when the symbols (or pulses) being transmitted within the piconets operating within relatively close proximity collide with one another thereby resulting in potentially lost data.

As is known, the Bluetooth® communication standard is the first such PAN communication standard that has been developed. In accordance with the Bluetooth® communication standard, the communication between the various devices in such a piconet is strictly performed using an M/S (Master/Slave) configuration. Each of the devices within the Bluetooth® piconet is M/S capable. Typically one of the devices, or a first device within the Bluetooth® piconet, transmits a beacon signal (or an access invitation signal) while operating as the "master" device of the Bluetooth® piconet to the other "slave" devices of the Bluetooth® piconet. In other words, the "master" device of the Bluetooth® piconet polls the other "slave" devices to get them to respond.

Another PAN communication standard that has been developed is that of the IEEE (Institute of Electrical & Electronics Engineers) 802.15 standard. Variations and extensions of the 802.15 standard (e.g., 802.15.1, 802.15.2, 802.15.3, and others that may be developed over time) have also been under development during recent times. Operation according to 802.15.3 differs from that of the Bluetooth® communication standard. According to 802.15.3, one particular device is specially designed to operate as a piconet controller (master) within a piconet; that is to say, every device in such an IEEE 802.15.3 piconet does not operate in an M/S mode. One device within such an IEEE 802.15.3 piconet operates as a piconet controller (master), and the other devices within the IEEE 802.15.3 piconet may be implemented as user devices (slaves). It is also noted that the piconet controller (master) may operate to facilitate the p2p (peer to peer) operation between the various user devices (slaves) within the piconet.

There has been a great deal of development recently in seeking to enable the simultaneous operation of piconets within relatively close proximity with one another (without suffering significant deleterious effects such as degradation of performance, large numbers of collisions of transmitted symbols within the various piconets, and other such deleterious effects. Currently, there does not exist in the art a sufficient solution that may accommodate the undesirable effects of symbol collisions within such piconets in a satisfactory manner. While there have been some attempts to try to deal with minimizing these undesirable symbol collisions within such piconets, there does not yet exist a satisfactory manner in which symbol collisions (when they do in fact occur) may be dealt with while maintaining a very high level of performance for all of the devices within the piconet.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

Various aspects of the invention can be found in a communication device that operates within a piconet. This communication device may be viewed as being a piconet operable device. The piconet operable device includes a radio front end, an ADC (Analog to Digital Converter), a demodulator, and a decoder. The radio front end receives and filters a continuous time signal. The ADC samples the received and filtered continuous time signal thereby generating a discrete time signal and extracting I, Q (In-phase, Quadrature) components there from. The demodulator receives the I, Q components and performs symbol mapping of the I, Q components thereby generating a sequence of discrete-valued modulation symbols. The demodulator estimates at least one of a location and a level of interference associated with a collision within a symbol of the sequence of discrete-valued modulation symbols. The demodulator then categorizes the level of the interference into at least two categories. When the level of the interference is categorized into a first category of the at least two categories, the demodulator treats interference affected bits of the symbol as erasures thereby generating a first demodulator output symbol. However, when the level of the interference is categorized into a second category of the at least two categories. The demodulator also selectively de-weights interference affected bits of the symbol according to a de-weighting factor thereby generating a second demodulator output symbol. The decoder decodes the first demodulator output symbol or the second demodulator output symbol to make best estimates of the at least one information bit contained therein.

In certain embodiments, the demodulator estimates interference associated with the collision within the symbol on a power per bit basis. The location of interference associated with the collision within the symbol may be used to identify the interference affected bits of the symbol. The demodulator may be implemented in a variety of different of ways; one of which is when the demodulator is implemented as a baseband processor/MAC (Medium Access Controller) within the piconet operable device.

The piconet operable device may be viewed as being a first piconet operable device that operates within a first piconet that substantially occupies a first region, and a second piconet operable device operates within a second piconet that substantially occupies a second region. These two piconets may be viewed as SOPs (Simultaneously Operating Piconets), and sometimes the first region and the second region occupy at least a portion of common space. In this SOP context, the symbol may be viewed as being a first symbol that collides with a second symbol that is received by the second piconet operable device before being received. Collisions between symbols within the first piconet and symbols within the second piconet can occur according to a structured interference pattern. Sometimes, this structured interference pattern is a predetermined structured interference pattern, and the demodulator estimates at least one of the location and the level of interference associated with the collision within the symbol based on the predetermined structured interference pattern.

In some instances, the demodulator estimates the level of interference associated with the collision within the symbol by measuring a total instantaneous power of the continuous time signal associated with the symbol, averaging a power of the continuous time signal associated with the symbol, and subtracting an expected reference signal power associated with the symbol from a previously obtained channel estimate or power measurement of the continuous time signal associated with the symbol.

There may be scenarios when the symbol does not include any interference; this may be viewed as being a third category of interference. For example, in such instances, when the level of the interference is categorized into a third category of the at least two categories, the decoder directly decodes the symbol to make best estimates of the at least one information bit contained therein. That is to say, no de-weighting of the symbol is performed in such instances; the symbol is passed directly through to the decoder for decoding processing.

The invention envisions any type of communication device that supports the functionality and/or processing described herein. Moreover, various types of methods may be performed to support the functionality described herein without departing from the scope and spirit of the invention as well.

BRIEF DESCRIPTION OF THE SEVERAL VIEWS OF THE DRAWINGS

FIG. 1A is a diagram illustrating an embodiment of the frequency spectrum of a UWB (Ultra Wide Band) signal when compared to some other signal types according to the invention.

FIG. 1B is a diagram illustrating an embodiment of UWB (Ultra Wide Band) spectrum partitioning into a plurality of sub-bands according to the invention.

FIG. 3 is a diagram illustrating an embodiment showing comparison of frequency hopping time interval duration compared to a communication channel impulse response according to the invention.

FIG. 24A, FIG. 24B, and FIG. 24C are flowcharts illustrating various embodiments of methods for estimating a level (e.g., magnitude) of interference of a signal for use in performing interference compensation according to the invention.

DETAILED DESCRIPTION OF THE INVENTION

Figure 2A:
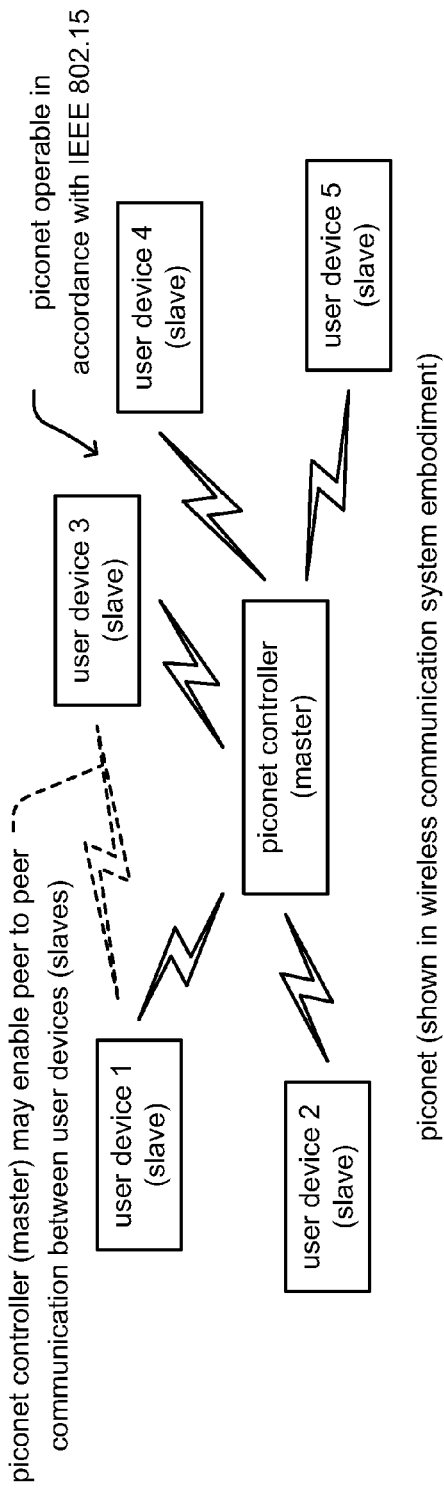
FIG. 2A is a diagram illustrating an embodiment of a piconet or WPAN (Wireless Personal Area Network) (shown as a wireless communication system) that is built according to the invention.

A novel approach is presented herein by which a piconet, or SOPs (Simultaneously Operating Piconets), may operate in such a manner as to have a minimal amount (if any) of interference between them. A single carrier (e.g., single carrier frequency) solution is provided in place of an OFDM (Orthogonal Frequency Division Multiplexing) solution. A piconet operable device is presented to include intelligence (e.g., smart receiver structure within the piconet operable device) that is able to perform estimation of the location and level (e.g., magnitude) of the interference and to perform appropriate processing to minimize its impact when demodulating and decoding a received signal. For example, this may involve selectively de-weighting only specific bits of one or more individual symbols of the received and demodulated signal.

Some background information is initially provided below to acquaint the reader to the particular context of operation of piconet and their use of the UWB (Ultra Wide Band) portion of the frequency spectrum.

FIG. 1A is a diagram illustrating an embodiment of the frequency spectrum of a UWB (Ultra Wide Band) signal when compared to some other signal types according to the invention. In contradistinction to RF (Radio Frequency) communications that operate by using a narrowband carrier frequency to transmit information, UWB communications operate by sending pulses of energy across a broad frequency spectrum. For example, an RF signal may be viewed as occupying the range of spectra of a narrowband frequency. Also, in contradistinction to a spread-spectrum signal whose intensity (magnitude) generally rises above the noise floor within an available spectrum and also occupies a relatively narrower portion of the available spectrum, a UWB signal may actually be viewed as pulse shaped noise (that may never exceed the noise floor within the available spectrum). A spread-spectrum signal may be viewed as a signal that occupies a frequency band that is much wider than the minimum bandwidth required by the information signal. For example, a transmitter "spreads" the energy (that is typically originally concentrated in narrowband) across a number of frequency band channels on a wider electromagnetic spectrum. Some benefits of a spread-spectrum signal include improved privacy, decreased narrowband interference, and increased signal capacity.

However, a UWB signal's PSD (Power Spectral Density) actually curves across the available spectrum, whereas the PSD of noise generally looks similar across the entire range of the available spectrum. Because of this distinction of shaping of the UWB signal and the noise across the available spectrum, the noise does not fully obliterate a pulse that is transmitted as a UWB signal. It is also important to note that a UWB signal is a function of time, not frequency.

FIG. 1B is a diagram illustrating an embodiment of UWB (Ultra Wide Band) spectrum partitioning into a plurality of sub-bands (or channels) according to the invention. Relatively recently, the FCC (Federal Communications Commission) has defined the available spectrum for UWB communications as being between 3.1 GHz (Giga-Hertz) and 10.6 GHz. In addition, the FCC defined the minimum spectral width of any sub-band (or channel) within the available UWB spectrum to be 500 MHz (Mega-Hertz).

Moreover, this FCC definition allows for a PSD across the UWB spectrum of −41.25 dBm/MHz of bandwidth. As a brief review, 0 dBm is the dB (decibel) measure of power of a signal referenced to 1 mW (milli-Watt). This means that the total power that may be employed by a UWB signal is approximately −14.26 dBm in any individual 500 MHz sub-band (or channel) within the entire available UWB bandwidth of 7.5 GHz. In addition, if a pulse is sent using the entire 7.5 GHz of available UWB bandwidth, then the total power that may be employed by a UWB signal is approximately −2.5 dBm.

FIG. 2A is a diagram illustrating an embodiment of a piconet or WPAN (Wireless Personal Area Network) (shown as a wireless communication system) that is built according to the invention. As described briefly above, a piconet may be viewed as being the network that is established when any two devices connect to support communication between them. This operation is typically within the context of communication being performed in an M/S (Master/Slave) relationship. The piconet may typically be implemented using a piconet controller (master) and 1 or more user devices (slaves). The user devices (slaves) typically do not communication directly with one another in this embodiment, but with each other through the piconet controller (master). However, 2 user devices (slaves) may be set up by the piconet controller (master) to communicate directly with one another using p2p (peer to peer) communication. This p2p communication set up for the 2 user devices (slaves) is typically performed by the piconet controller (master).

To support communication between each of the plurality of user devices (slaves), simultaneously at some times, and the piconet controller (master), the communication must be implemented in such a way that the communication links between each user device (slave) and the piconet controller (master) do not interfere with the other communication links between the other user devices (slaves) and the piconet controller (master). Moreover, when two or more piconets operate within relatively close proximity to one another, the communication within each of the respective piconets must be implemented in such a way that simultaneously operation of the two or more piconets (e.g., the coexistence and operation) may be performed without interfering with one another.

While it is noted that the user devices (slaves) do not typically communicate directly with one another (that is to say, via the piconet controller (master)), it is also noted that the piconet controller (master) may sometimes operate to enable p2p communication between the 2 user devices (slaves) within the piconet. Moreover, the piconet in this embodiment as well as within other embodiments described herein are all operable in accordance with the conditions and constraints provided by the IEEE (Institute of Electrical & Electronics Engineers) 802.15 standard and may also be implemented such that the piconet is operable in accordance with other wireless communication standards as well. Moreover, this piconet is also operable within the various alternative and subsequent drafts of the IEEE 801.15 standards being developed including the IEEE 802.15 WPAN High Rate Alternative PHY Task Group 3a (TG3a) draft standard.

Figure 2B:
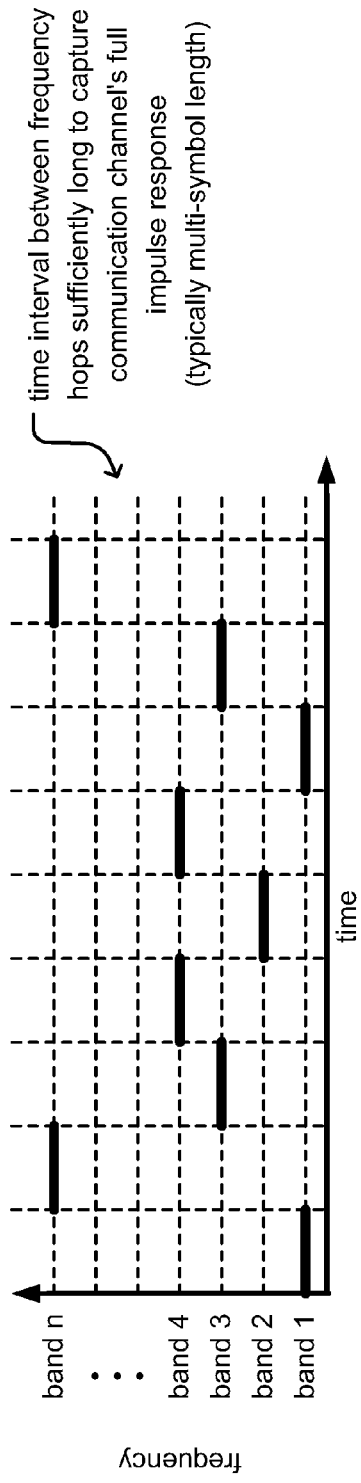
FIG. 2B is a diagram illustrating an embodiment of frequency hopping that may be performed according to the invention.

FIG. 2B is a diagram illustrating an embodiment of frequency hopping that is performed according to the invention. As a function of time, the frequency band (or channel) that is being used will "hop" from one frequency band (or channel) to another. Frequency hopping is one means of operation that may be used to make a communication channel more robust. For example, when noise, such as background noise, is relatively localized to a particular portion of the spectrum, the frequency hopping will help minimize the effects this frequency specific and frequency localized noise.

Frequency hopping may be viewed as a repeated switching of the frequency of a signal during transmission. In a communication system, a transmitter and a receiver operate in synchronization so that each operates at the same frequency at any given time. In this particular embodiment, an available frequency spectrum is sub-divided into n bands (or n channels). The communication operates using a band 1 during a first time interval, then operates using a band n during a second time interval, then operates using a band 3 during a third time interval, and so on as indicated in the diagram.

It is also noted that the time interval between the various frequency hops may be implemented as being sufficiently long so as to permit the capture of a communication channel's full impulse response at the various piconet operable devices within the piconet (e.g., the piconet controller (master) and the user devices (slaves)). This time interval at which the communication system operates at any given frequency will typically be multi-symbol lengths in duration. Alternatively, very fast frequency hopping may be performed when such considerations are not desired or critical.

As an example of the operation of frequency hopping, in the context of a UWB signal, the UWB spectrum may be divided into 15 sub-bands of 500 MHz bandwidth, the frequency hopping may be viewed as hopping between the various 500 MHz bandwidth sub-bands (or channels) as a function of time.

FIG. 3 is a diagram illustrating an embodiment showing comparison of frequency hopping time interval duration compared to a communication channel impulse response according to the invention. The impulse response, as a function of time, is shown for the communication channel between a user device (slave) and a piconet controller (master). This impulse response may be viewed as the response of the communication system when an impulse is provided thereto. The impulse response varies in intensity as a function of time before dissipating. The time that the impulse response takes to dissipate completely may be viewed as the impulse response time of the communication channel.

When compared to frequency hopping performed according to the invention, the time interval at which the communication system operates using a first frequency band (shown as a band 1 during a first time interval) is longer than the impulse response time of the communication channel. This will allow all of the energy of a pulse to be captured when transmitted and when operating at this frequency band. Similarly, when the operation switches to another frequency band according to the frequency hopping time-frequency code sequence, that corresponding time interval will also be longer than the impulse response time of the communication channel.

Within some prior art piconet approaches, frequency hopping alone has been implemented such that the time intervals are typically only of a single symbol's length; this is typically much shorter than the impulse response time of the communication channel. Much of the energy of a transmitted pulse may be lost if the frequency hops are performed too quickly. The longer duration over which the frequency hops are performed according to the invention allows for capturing of all of the energy of the transmitted pulse thereby ensuring more robust and more accurate communications. Alternatively, again, very fast frequency hopping may be performed when such considerations are not desired or critical.

Within the context of the invention, the time-frequency code employed to govern communication between 2 devices within the piconet may be viewed as an operational parameter. This operational parameter may be modified in real time based on a change in another operational parameter that governs communication between the 2 devices. For example, a $1^{st}$ time-frequency code may be employed at one time, and a $2^{nd}$ time-frequency code may be performed subsequently based on a change of another of the operational parameters. Based on a change in the operational parameter of interference of the communication link between 2 devices, as an example, one time-frequency code may more effectively support communication between the 2 devices compared to the other time-frequency codes that are available. As is also described in other of the embodiments of the invention, other operational parameters may also be modified in response to a change in 1 or more of the other operational parameters as well without departing from the scope and spirit of the invention.

Again, as briefly mentioned above, it is also noted that the piconet controller (master) may enable p2p communication between two separate user devices (slaves) within the piconet. The manner of communication described herein with respect to communication between the piconet controller (master) and any one user device (slave) is also applicable to p2p communication that may be performed between two separate user devices (slaves) within the piconet.

Figure 4:
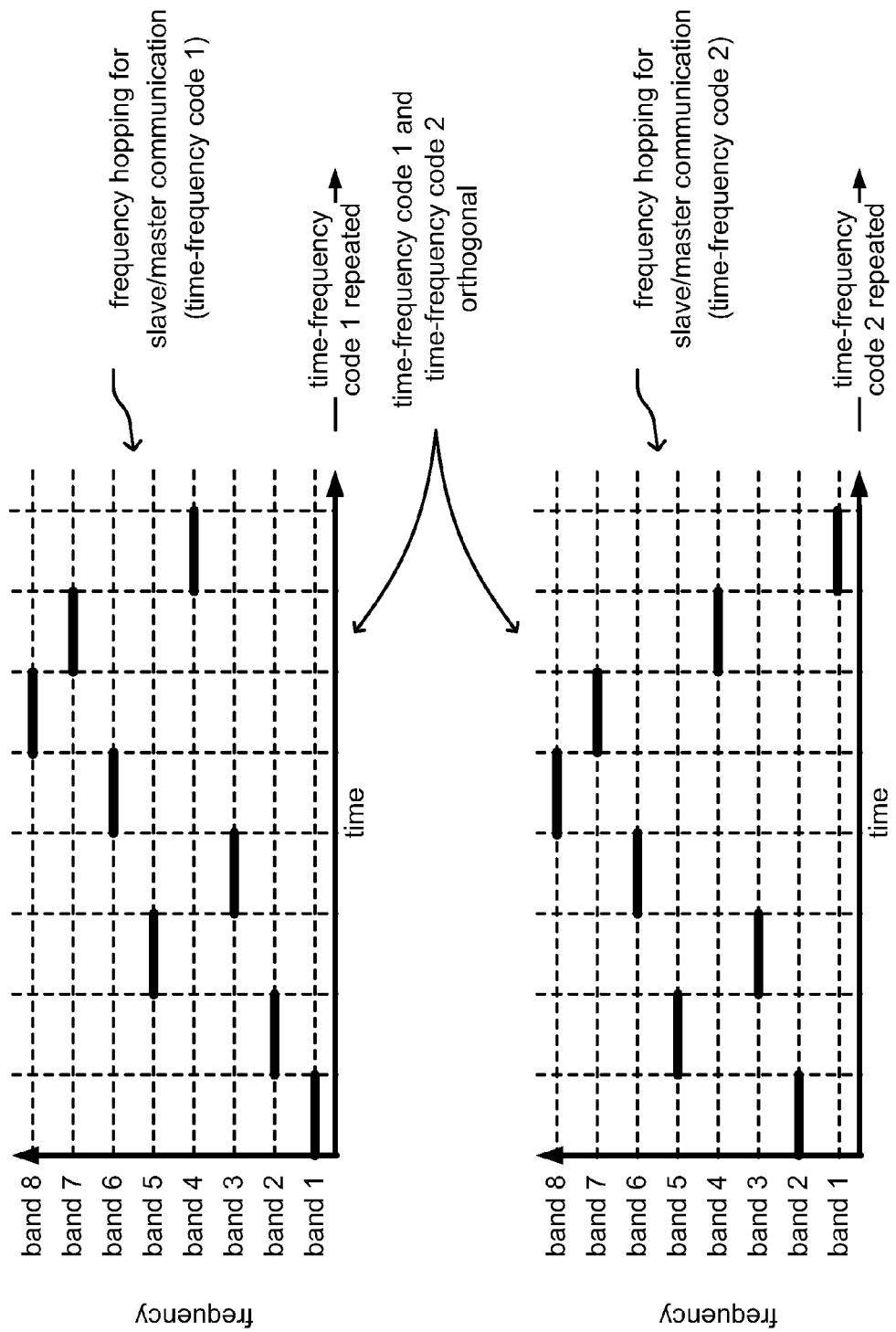
FIG. 4 is a diagram illustrating another embodiment of frequency hopping that is performed according to the invention.

FIG. 4 is a diagram illustrating another embodiment of frequency hopping that is performed according to the invention. The description of this diagram may be viewed as being a specific example of the operational parameter of the time-frequency codes employed to support communication across various PHY (physical layer) links between the various devices within the piconet.

This embodiment shows how two separate piconets (or two separate groups of devices within a piconet) may operate using two separate time-frequency codes that are orthogonal to one another. For example, a first piconet (or first group of devices) performs frequency hopping for slave/master communication using a first time-frequency code (time-frequency code 1). In addition, a second piconet (or second group of devices) performs frequency hopping for slave/master communication using a second time-frequency code (time-frequency code 1). During each time interval, the time-frequency code 1 and the time-frequency code 2 each operate using a different band (or channel). For example, when the time-frequency code 1 operates using the band 1, the time-frequency code 2 operates using the band 2. Similarly, when the time-frequency code 1 operates using the band 2, the time-frequency code 2 operates using the band 5. This orthogonal operation of the 2 time-frequency codes continues for the duration of the respective time-frequency code sequences.

Each of the respective time-frequency code sequences are repeated to support subsequent operation of the respective piconets. This orthogonal operation of employing two time-frequency codes allows more than one piconet to coexist in relative close proximity with one another. In addition, it is noted that all of the user devices (slaves) within a respective piconet (or group of devices) will communicate with their corresponding piconet controller (master) using their time-frequency code sequence, and all of the user devices (slaves) within another respective piconet will communicate with their corresponding piconet controller (master) using their corresponding time-frequency code sequence.

Figure 5:
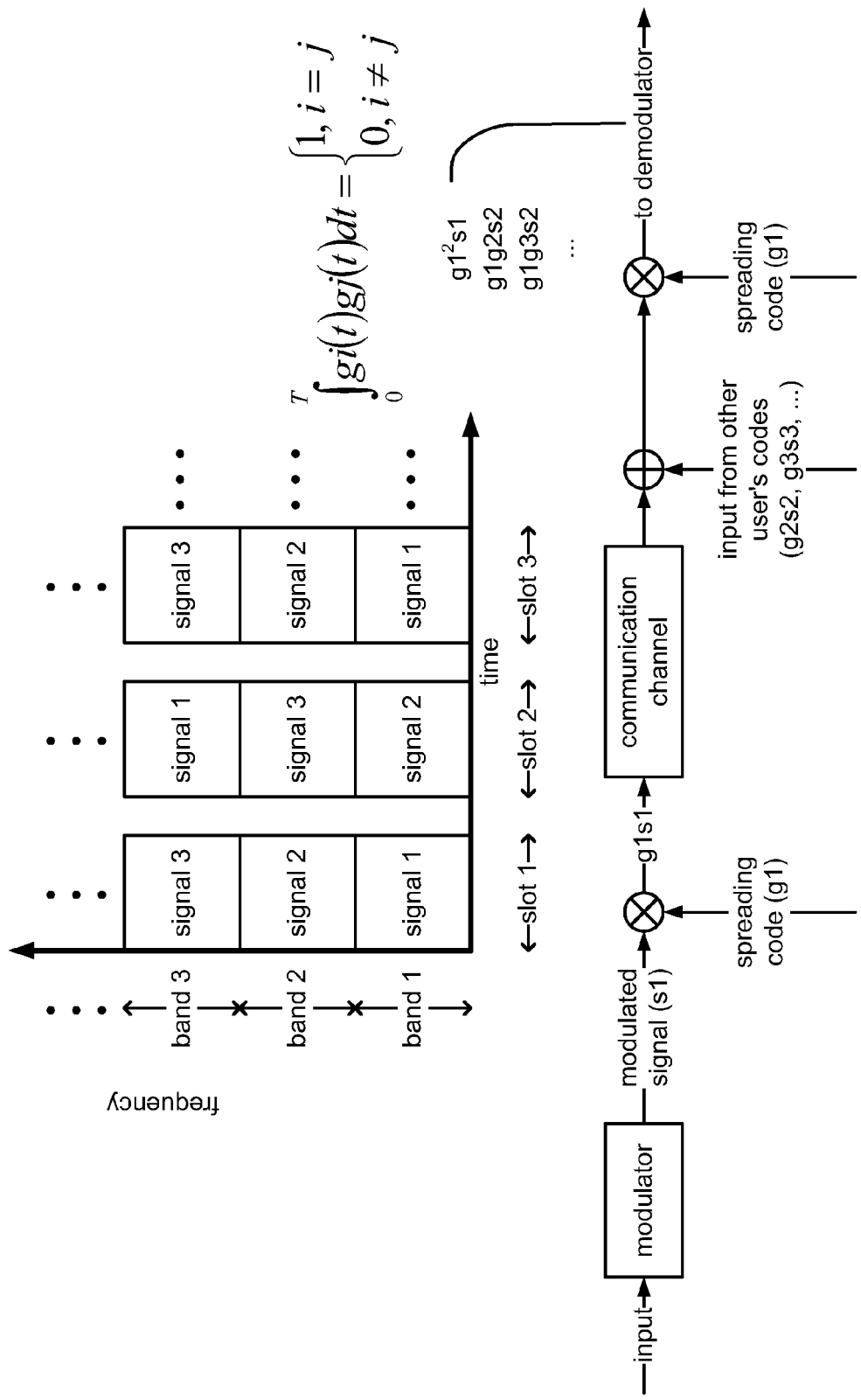
FIG. 5 is a diagram illustrating an embodiment of CDMA (Code Division Multiple Access) that may be employed according to the invention.

FIG. 5 is a diagram illustrating an embodiment of CDMA (Code Division Multiple Access) that may be employed according to the invention. CDMA may be viewed as the short term assignment of a frequency band to various signal sources. At each successive time slot, the band assignments are reordered either adaptively or according to a predetermined sequence. For example, during a time slot 1, a signal 1 operates using a band 1, a signal 2 operates using a band 2, and a signal 3 operates using a band 3. Then, during a time slot 2, the signal 1 operates using the band 3, the signal 2 operates using the band 1, and the signal 3 operates using the band 2. During a time slot 3, the signal 1 operates using the band 1, the signal 2 operates using the band 2, and the signal 3 operates using the band 3.

The operation of communication devices (e.g., users) is performed using a PN (Pseudo-Noise) code that is typically orthogonal to the other PNs codes employed by the other communication devices within the communication system. This PN code is oftentimes referred to as a spreading code. A modulated signal is spread using that spreading code and the spread signal is then transmitted across a communication channel (e.g., a PHY (physical layer) link that communicatively couples 2 devices within the piconet). At a receiver end of the communication channel, this same spreading code (e.g., this PN code) is employed to de-spread the code so that data sent from a particular device may be demodulated by the appropriate destination device.

The operation of CDMA may be better understood when viewed as the transformation of an input signal through a communication system. At a transmitter end of a communication channel, input from a particular user is first provided to a modulator where the data is modulated by a carrier thereby generating a modulated signal (s1). Next, the data-modulated signal is then multiplied by a spreading code (g1) that corresponds to that particular user thereby generating a spread signal (g1s1) that is then provided to the communication channel. This signal may be viewed as a convolution of the frequency spectrum of the modulated signal and the frequency spectrum of the spreading code. Simultaneously, input from other users within the communication system is modulated and spread in an analogous manner.

At the receiver end of the communication channel, a linear combination of all of the spread signals provided by the other users is received, e.g., g1s1+g2s2+g3s3+ . . . and so on for all of the users. At the receiver end, the total received signal is then multiplied by the spreading code (g1) thereby generating a signal that includes $g1^2 s1$ plus a composite of the undesired signal (e.g., g1g2s2+g1g3s3+ . . . and so on).

In CDMA, the spreading codes are typically chosen such that they are orthogonal to one another. That is to say, when any one spreading code is multiplied with another spreading code, the result is zero. This way, all of the undesired signals drop out. Given that the spreading codes g1(t), g2(t), g3(t) and so on, the orthogonality of the spreading codes may be represented as follows:

$$\int_0^T gi(t)gj(t)\,dt = \begin{cases} 1, & i = j \\ 0, & i \neq j \end{cases}$$

This final signal is then passed to a demodulator where the input that has been provided at the transmitter end of the communication channel is extracted and a best estimate is made thereof.

Figure 6:
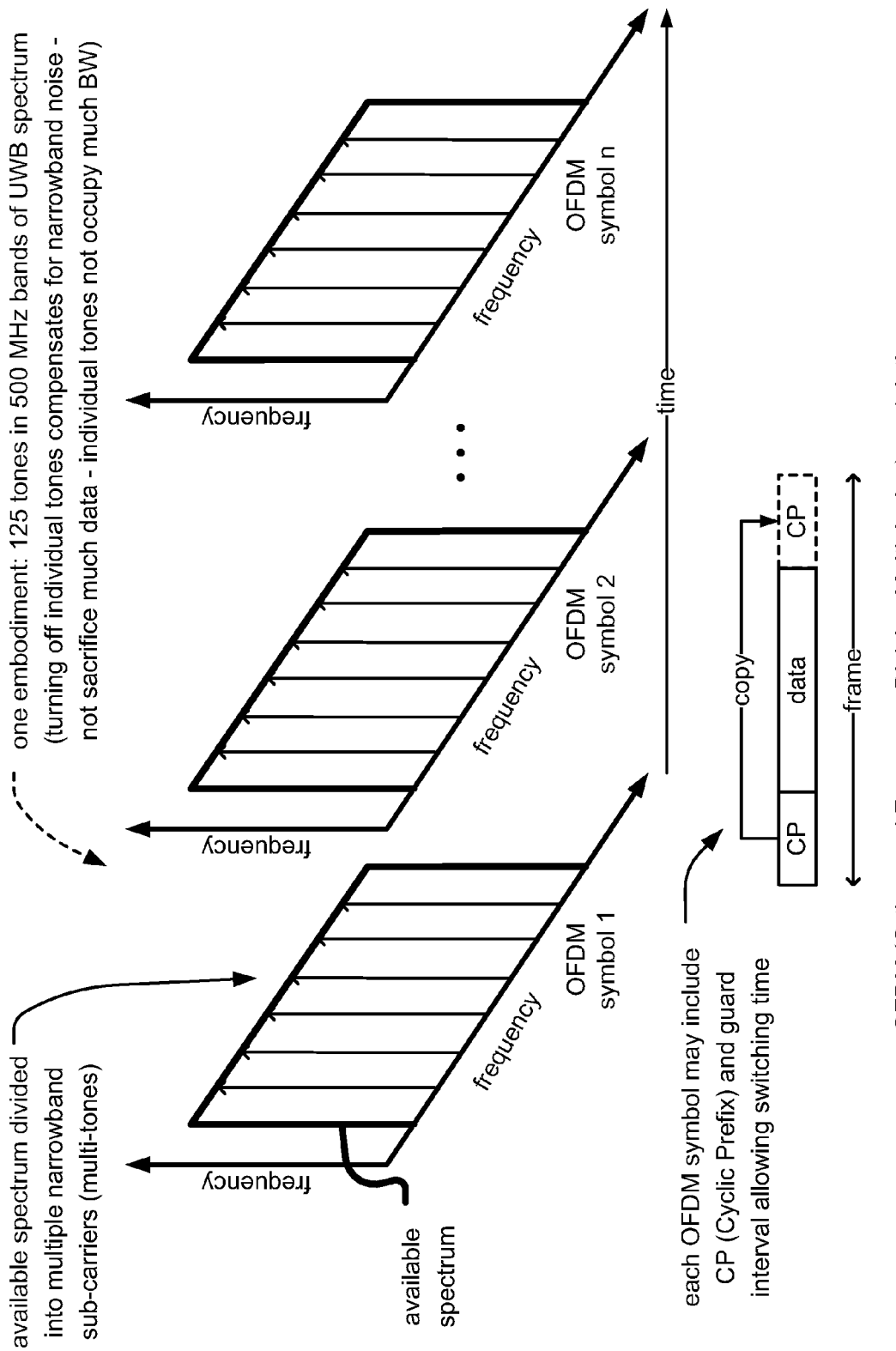
FIG. 6 is a diagram illustrating an embodiment of OFDM (Orthogonal Frequency Division Multiplexing) that may be employed according to the invention.

FIG. 6 is a diagram illustrating an embodiment of OFDM (Orthogonal Frequency Division Multiplexing) modulation that may be employed according to the invention. OFDM modulation may be viewed a dividing up an available spectrum into a plurality of narrowband sub-carriers (e.g., lower data rate carriers). Typically, the frequency responses of these sub-carriers are overlapping and orthogonal. Each sub-carrier may be modulated using any of a variety of modulation coding techniques.

OFDM modulation operates by performing simultaneous transmission of a larger number of narrowband carriers (or multi-tones). Oftentimes a guard interval or guard space is also employed between the various OFDM symbols to try to minimize the effects of ISI (Inter-Symbol Interference) that may be caused by the effects of multi-path within the communication system (which can be particularly of concern in wireless communication systems). In addition, a CP (Cyclic Prefix) may also be employed within the guard interval to allow switching time (when jumping to a new band) and to help maintain orthogonality of the OFDM symbols.

In one UWB embodiment, 125 OFDM tones may be implemented in any one of the 15 sub-bands of 500 MHz bandwidth within the UWB spectrum. Other benefits are achieved using OFDM. For example, the use of multi-tones allows for an effective solution to deal with narrowband interference. For example, a tone that corresponds to the locality of the narrowband interference may be turned off (to eliminate the susceptibility to this narrowband interference) and still provide for efficient operation. This turning off of these one or few tones will not result in a great loss of bandwidth because each individual tone does not occupy a great deal of bandwidth within the available spectrum employed by the OFDM symbol. Therefore, OFDM modulation provides a solution that may be employed in accordance with invention that provides link quality intelligence from the PHY (physical layer) to the higher protocol layers within devices operating within wireless networks (e.g., piconets as one example).

Figure 7:
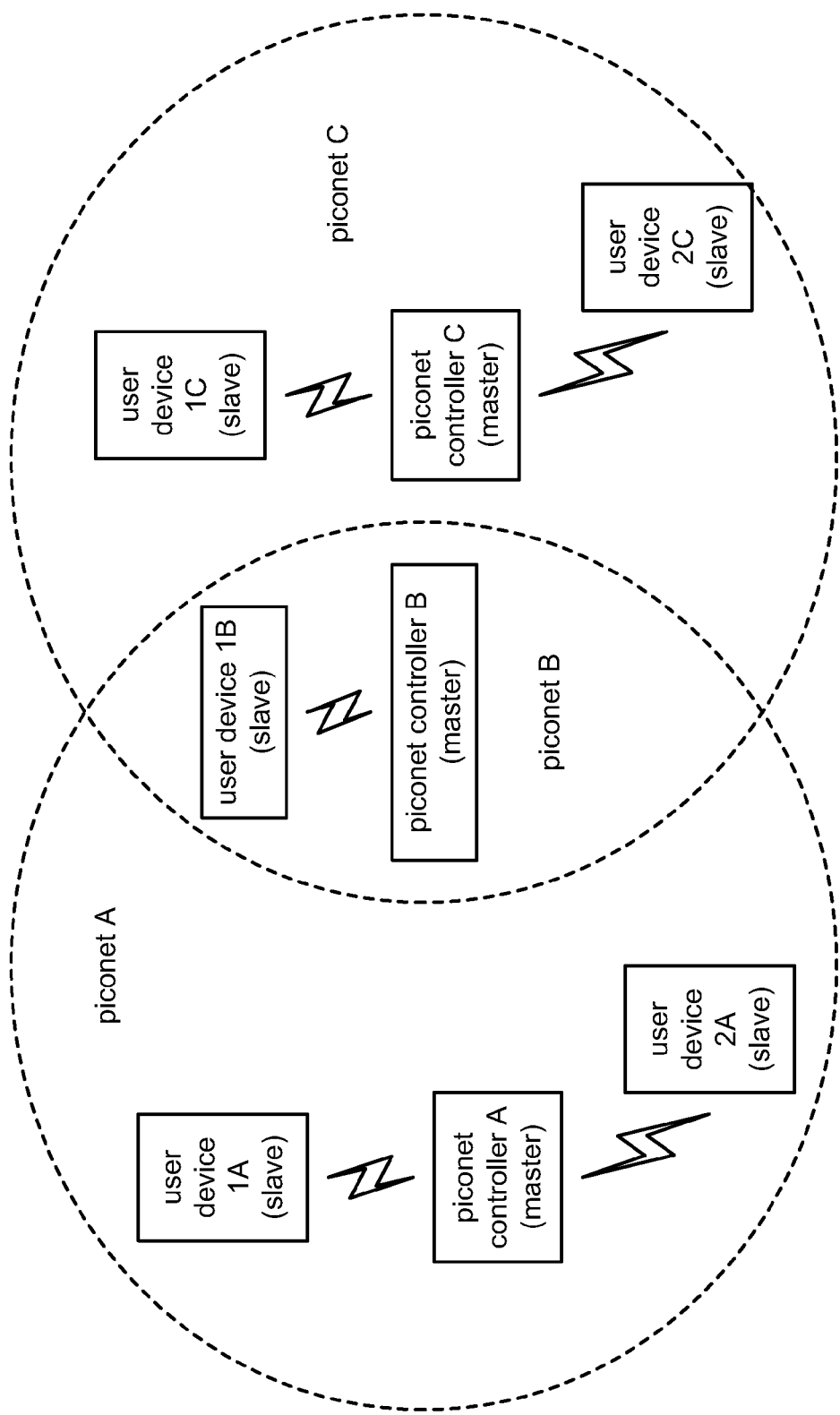
FIG. 7 is a diagram illustrating an embodiment of SOPs (Simultaneously Operating Piconets) within relatively close proximity to one another (having some overlap) according to the invention.

FIG. 7 is a diagram illustrating an embodiment of SOPs (Simultaneously Operating Piconets) within relatively close proximity to one another (having some overlap) according to the invention. This embodiment shows how various piconets may operate in such a way that the individual devices within these piconets are sufficiently close to one another that they may sometimes even associate with different piconets at different times. This inherently requires operating the various piconets in such a way that they do not interfere with one another. For example, each piconet may operate using a different frequency hopping approach. Each piconet may employ a different time-frequency code such that undesirable symbol collisions are kept at a relatively low rate of occurrence. Other operational parameters may alternatively be employed for each of the various piconets. For example, different PN (Pseudo-Noise) codes may be employed to govern the spreading/de-spreading of symbols transmitted within the various piconets. Moreover, even other operational parameters may be implemented such that any undesirable symbol collisions at kept at a relative minimum.

The manner in which the various devices within the piconet operate may be performed in such a way that when symbol collisions do in fact occur (e.g., when interference does occur) the interference has a particular characteristic, namely, a relatively structured interference. Thereafter, using an understanding of this structured interference, intelligent processing of symbols within the various devices may be made so as to support a much higher level of performance than is provided by communication systems whose high end of performance is limited by the AWGN (Additive White Gaussian Noise) existent within the communication system. The performance of a piconet operating this way will typically be limited only by the out of band roll off and front end range (e.g., the radio front end and the filtering performed therein) of a device operating within such a piconet.

Various aspects of the invention operate the various devices within a piconet using a combination of SH-OFDM (Slow Hopping-Orthogonal Frequency Division Multiplexing) and a relatively slower PRF (Pulse Repetition Frequency) than is typically performed within prior art piconets. By operating the various devices of the piconet in such a way, when symbol collisions do in fact occur, they will exhibit the structured interference briefly describe above. Several examples are provided below showing more particularly how symbol collisions will exhibit this structured interference. In addition, various embodiments are also described about how this structure interference may be capitalized upon to ensure a high level of performance of the overall piconet.

As shown within this embodiment, a piconet A includes a piconet controller A (master) and user devices 1A & 2A (slaves). Similarly, a piconet C includes a piconet controller C (master) and user devices 1C & 2C (slaves). In addition, a piconet B includes a piconet controller B (master) and a user device 1B (slave).

As can be seen, each of these various piconets A, B, and C operate such that they may have a portion of overlap with 1 or more of the other piconets. Some of the devices within these piconets may associate with different piconets at different points in time.

Again, each of the various devices within the piconets A, B, and C may operate using individually selected time-frequency codes that include appropriate combinations of SH-OFDM and a relatively slower PRFs than are typically performed within prior art piconets. By operating the piconets A, B, and C in such a manner that when symbol collisions in the region, they exhibit a relatively structured type of interference. Having an understanding of the nature of this structured interference allows the implementation of a receiver having some intelligence that may appropriately de-weight symbols that have experienced an undesirable symbol collision.

Figure 8:
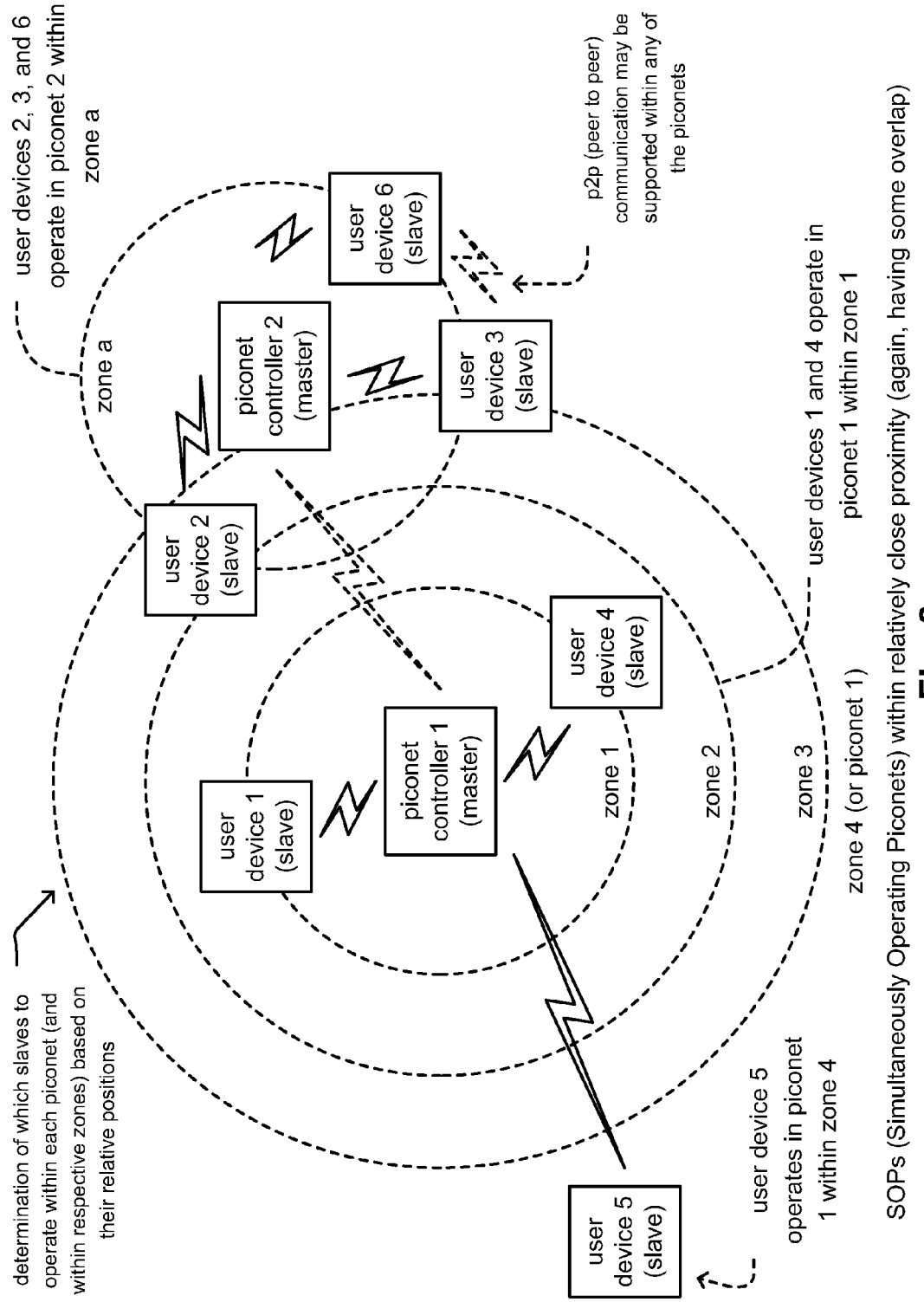
FIG. 8 is a diagram illustrating another embodiment of SOPs within relatively close proximity to one another (having some overlap) according to the invention.

FIG. 8 is a diagram illustrating another embodiment of SOPs within relatively close proximity to one another (having some overlap) according to the invention. However, in contradistinction to the embodiment described above, this embodiment shows how different time-frequency codes may be implemented even within a given piconet. This may be performed in addition to (e.g., in conjunction with) the different time-frequency codes being implemented for different piconets.

This embodiment shows a number of user devices (slaves) and 2 piconet controllers (masters) within a region. If desired, the locations of the various devices within this region may be ascertained using any number of means. In one such embodiment, both of the piconet controllers 1 & 2 (masters) are operable to perform ranging of all of the user devices (slaves) within the region. Together, the piconet controller (master) 1 and the piconet controller (master) 2 perform this ranging of all of the user devices (slaves), group them accordingly, an also select the appropriate time-frequency codes that are used to govern the communication between the user devices (slaves) and the piconet controllers 1 & 2 (masters). In addition, one or both of the piconet controllers 1 & 2 (masters) may also direct 2 or more of the user devices (slaves) to perform p2p communication between them and perform ranging of the relative distances between them; this information may then be provided to both of the piconet controllers 1 & 2 (masters). In doing so, triangulation may be performed by one or both of the piconet controllers 1 & 2 (masters) to determine the precise location of the user devices (slaves) within the region.

The distribution of the user devices (slaves) in this embodiment is such that the user devices (slaves) may appropriately be grouped to operate with one particular piconet controller (master) within the region. For example, those user devices (slaves) closer in vicinity to the piconet controller 2 (master) may be grouped within one group; that is to say, user devices 2, 3, & 6 (slaves) may be grouped within a zone whose communication is governed according to one time-frequency code in one piconet (e.g., piconet 2).

Similarly, the piconet controller 1 (master) services the other user devices 1 & 4 (slaves) (within a zone 1 using another time-frequency code), and the piconet controller 1 (master) services user device 5 (slave) (as being outside a zone 3 using yet another time-frequency code). These user devices (slaves) and the piconet controller 1 (master) may be viewed as being another piconet (e.g., piconet 1).

Alternatively, the communication between the various groups of user devices (slaves) and their respective piconet controller (master) may be governed using different profiles. Each of these profiles may include information corresponding to the time-frequency code employed, the rate of frequency hopping, and/or the PRF that governs the communication of those devices (among other operational parameters). Generally speaking, this embodiment shows how the communication between various devices may not only be implemented differently within different piconets, but also may be implemented differently between various devices within a given piconet.

Figure 9:
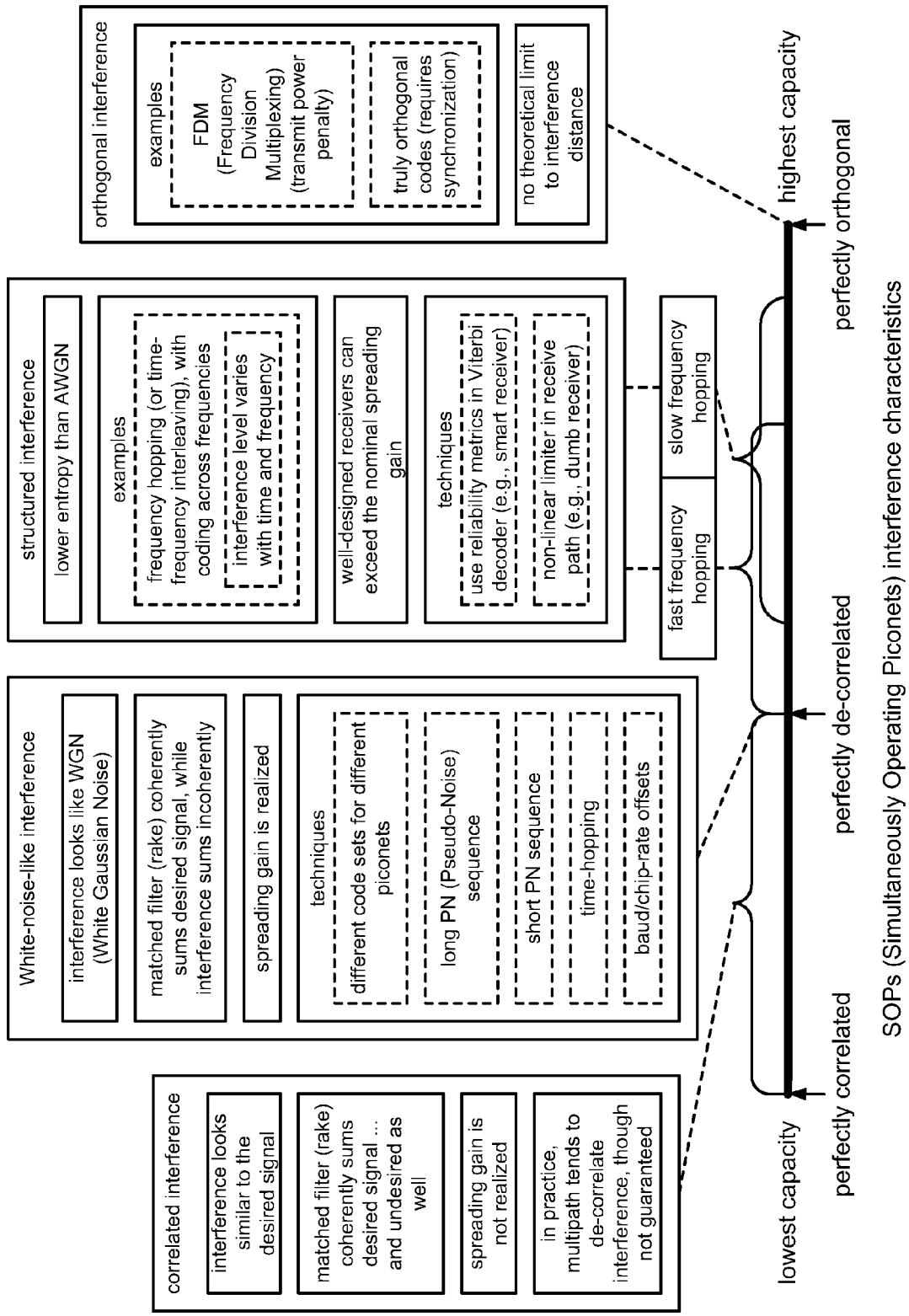
FIG. 9 is a diagram illustrating an embodiment of SOPs interference characteristics according to the invention.

FIG. 9 is a diagram illustrating an embodiment of SOPs interference characteristics according to the invention. The interference regions are shown in this diagram for many different ways of implementing SOPs. A spectrum of lowest capacity of a piconet communication system ranging to a highest capacity is shown for various manners in which a piconet communication system may be operated. At the lowest capacity end of the spectrum, the interference is perfectly correlated. At the highest capacity end of the spectrum, the interference is perfectly orthogonal. In the interim, there is a region of the spectrum where the interference is perfectly de-correlated. This region may be characterized as unstructured interference. Moving towards the highest capacity portion of the spectrum, there is a portion of the spectrum where the interference may then be characterized as structured interference.

Starting at the low end of capacity, correlated interference may be characterized as interference that looks similar to the desired signal. To accommodate this type of interference, a matched filter (rake) may be implemented to coherently sum the desired signal. However, such a matched filter (rake) also coherently sums the undesired signal as well as the desired signal, and this typically requires more complex receiver processing. No spreading gain is realized in this type of situation. In practice, multipath typically tends to de-correlate interference, though it is not guaranteed.

Continuing up the spectrum towards the highest capacity end, White-noise-like interference may be characterized as interference that looks like WGN (White Gaussian Noise). A matched filter (rake) may be implemented that coherently sums the desired signal, while the interference is summed incoherently. For this type of interference, spreading gain is in fact realized. There are a variety of techniques in which this may be implemented. For example, different code sets may be implemented for different piconets. Alternatively, long PN (Pseudo-Noise) sequences (or short PN sequences) may be implemented. Time-hopping may alternatively be performed. In addition, baud/chip-rate offsets may be employed as well.

Within the context of structured interference, fast or slow frequency hopping may be performed. One embodiment of the invention includes employing combined SH-OFDM (Slow Hopping-Orthogonal Frequency Division Multiplexing) that inherently provides a structured type of interference that may be handled very effectively using a receiver with some embedded intelligence to accommodate any undesirable symbol collisions. One of the reasons that this structure type of interference offers benefits over the WGN (White Gaussian Noise) is that this type of structured interference has lower entropy than interference added via AWGN (Additive White Gaussian Noise). This lower entropy may be deduced when analyzing and comparing these types of interferences. One example that may be implemented to achieve this structured interference is frequency hopping (or time-frequency interleaving), with coding across frequencies. The interference level then varies with time and frequency. Well-designed receivers can exceed the nominal spreading gain that may be achieved using prior art receivers. In addition some techniques in which this may be achieved include using reliability metrics in a Viterbi decoder (e.g., a smart receiver having some embedded intelligence). Alternatively, a non-linear limiter may be implemented in a receive path (e.g., in a dumb receiver).

Moving to the right hand portion of the spectrum, orthogonal interference may be found that is perfectly orthogonal. Examples of means of operating a communication system to achieve this orthogonal interference FDM (Frequency Division Multiplexing) that does, however, incur a transmit power penalty. In addition, any truly orthogonal code does require synchronization for proper performance. The advantage of such orthogonal codes is that there exists no theoretical limit to the interference distance of interference that is generated by such codes.

Figure 10:
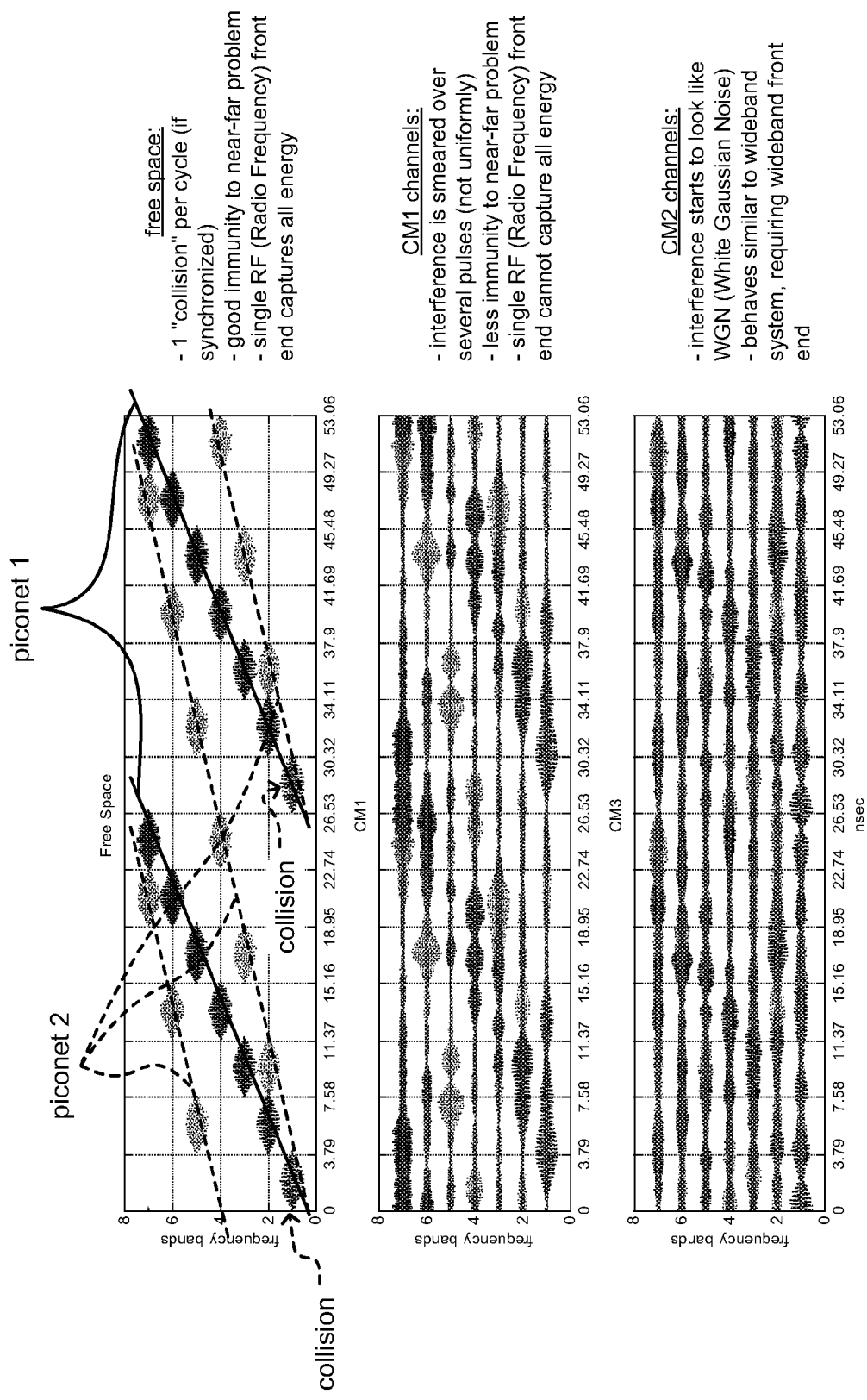
FIG. 10 is a diagram illustrating an embodiment of fast frequency hopping with multipath and interference according to the invention.

FIG. 10 is a diagram illustrating an embodiment of fast frequency hopping with multipath and interference according to the invention. This embodiment shows various time-frequency codes implemented within various piconets may suffer symbol collisions.

At the top of the diagram, free space communication of pulses is shown. As can be seen, 1 symbol "collision" will occur per cycle (if the time-frequency codes are synchronized with one another. This solution does provide good immunity to the near-far problem, and a single RF (Radio Frequency) front end may be implemented such that it captures all of the energy of the received pulses.

In the middle of the diagram, CM1 channels are shown where the interference is smeared over several pulses (and not uniformly). Unfortunately, this implementation presents less immunity to the near-far problem. Also unfortunately, a single RF (Radio Frequency) front end cannot capture all of the energy of received symbols.

At the bottom of the diagram, CM2 channels are shown where the interference starts to look like WGN (White Gaussian Noise). This interference behaves more similar to that of a wideband system. Therefore, to accommodate such signaling, a wideband front end need be implemented.

These various types of interference, generated by SOPs show more clearly and how difficult effective receiver processing may be when trying to deal with interference that does not have a predictable and manageable structure. Various aspects of the invention show how structure (and therefore more manageable) interference may be generated by operating various SOPs in a particular manner. For example, when operating these SOPs using SH-OFDM (Slow Hopping-Orthogonal Frequency Division Multiplexing) combined with a reduced PRF (Pulse Repetition Frequency), when compared to prior art piconets, will allow for the intelligent managing symbol collisions.

The current proposal for Multi-Band OFDM (MB-OFDM), shown as references [1,2] below, for IEEE 802.15.3a suffers from poor performance in the presence of close SOPs (Simultaneously Operating Piconets).

These documents are publicly available via the web sites of the IEEE working groups:

[1] Anuj Batra, Texas Instruments, et al., Project: "IEEE P802.15 Working Group for Wireless Personal Area Networks (WPANs)", "Multi-band OFDM Physical Layer Proposal," 71 slides, 14 Jul. 2003.

[2] Anuj Batra, Texas Instruments, et al., Project: "IEEE P802.15 Working Group for Wireless Personal Area Networks (WPANs)", "Multi-band OFDM Physical Layer Proposal for IEEE 802.15 Task Group 3a," 71 pages, 21 Jul. 2003.

Theoretically, a Multi-Band (time-hopping) system can achieve much better performance than a wideband (CDMA (Code Division Multiple Access)) system by exploiting the structured nature of the interference, but the current proposal fails to do this. In fact, it does not achieve even the nominal interference suppression of a wideband CDMA system.

Figure 11:
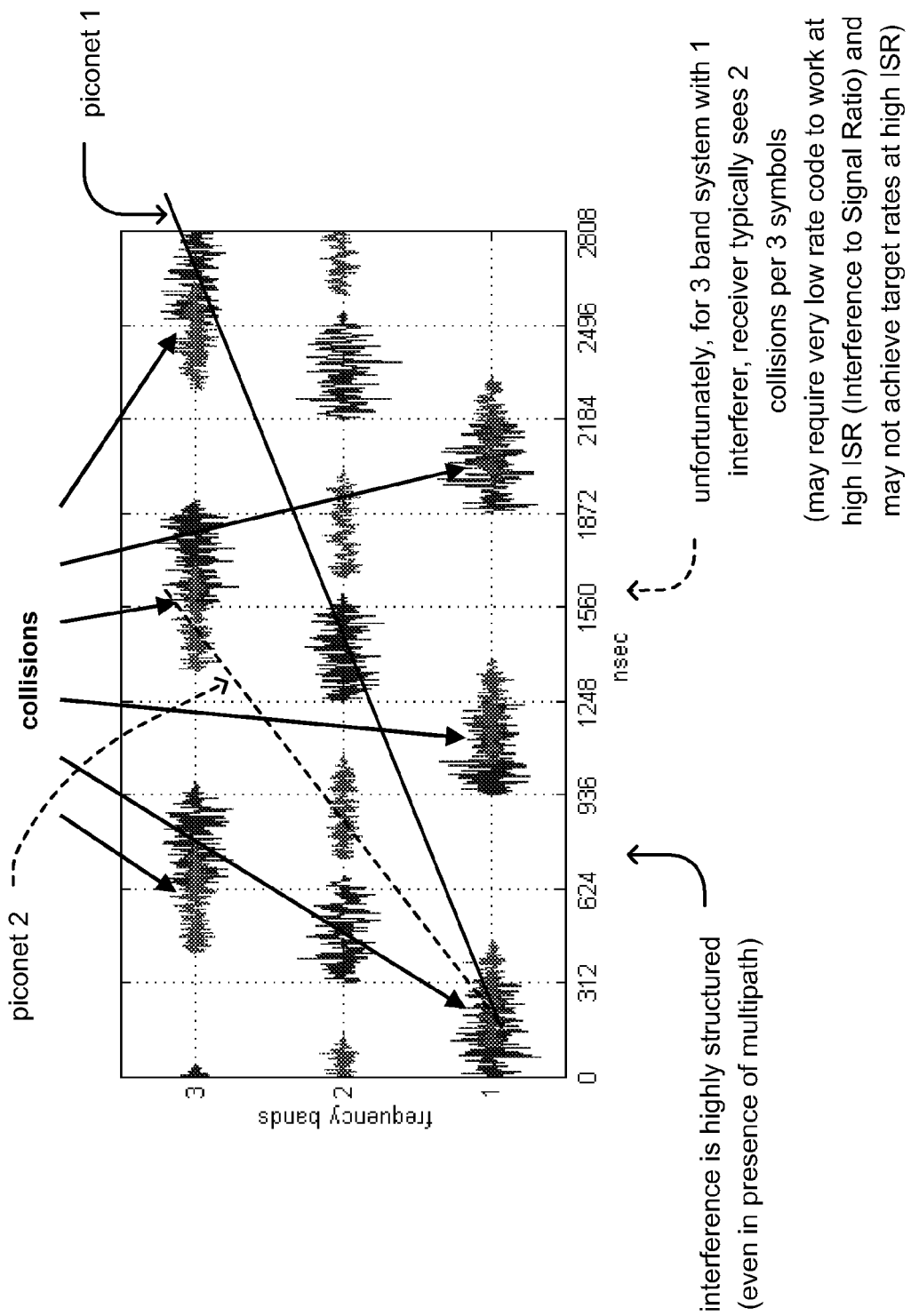
FIG. 11 is a diagram illustrating an embodiment of SH-OFDM (Slow-Hopping-Orthogonal Frequency Division Multiplexing) according to the invention.

FIG. 11 is a diagram illustrating an embodiment of SH-OFDM (Slow-Hopping-Orthogonal Frequency Division Multiplexing) according to the invention. Two (2) separate piconets (e.g., a piconet 1 and a piconet 2) each operate using different time-frequency codes, as can be seen where the frequency bands employed are changed as a function of time. During some instances, a common frequency band is employed by both piconets and undesirable symbol collisions may occur. One such effect is that, when a symbol collision occurs, the energy of such a "symbol" (really a symbol-collision-modified-symbol) will incur a greater amount of energy (or power).

However, one advantage of operating in such a way is that the interference in actually highly structured. This is true even in the presence of multipath effects within the piconets. There is a drawback, however, in that, unfortunately, for a 3 band system with 1 interferer, a receiver will typically see 2 collisions per 3 symbols. To compensate for this, the piconet may require a very low rate code to work at a high ISR (Interference to Signal Ratio). Moreover, the piconet may not achieve the target rates at the high ISR.

This diagram illustrates 2 adjacent piconets in a 3-band system, where the two piconets use different time-frequency codes. As shown, this typically results in 2 partial collisions out of every 3 symbols. Unfortunately, although the partial collisions affect only a portion of each hop in the time-domain, they affect all tones in the frequency domain. Thus, in an OFDM system, all bits are affected by a partial collision. In situations where the interferer is much closer than the transmitter of the desired signal, these collisions will be treated as erasures, and 2 out of every 3 coded bits will be erased.

However, the fact that the interference is highly structure, even in the presence of multipath, does provide for some operational advantages. In accordance with the SH-OFDM, by dwelling longer on each frequency band, symbol collisions may be confined to a single frequency hop. However, dealing with 2 partial collisions out of every 3 symbols can be extremely problematic for many applications.

Figure 12:
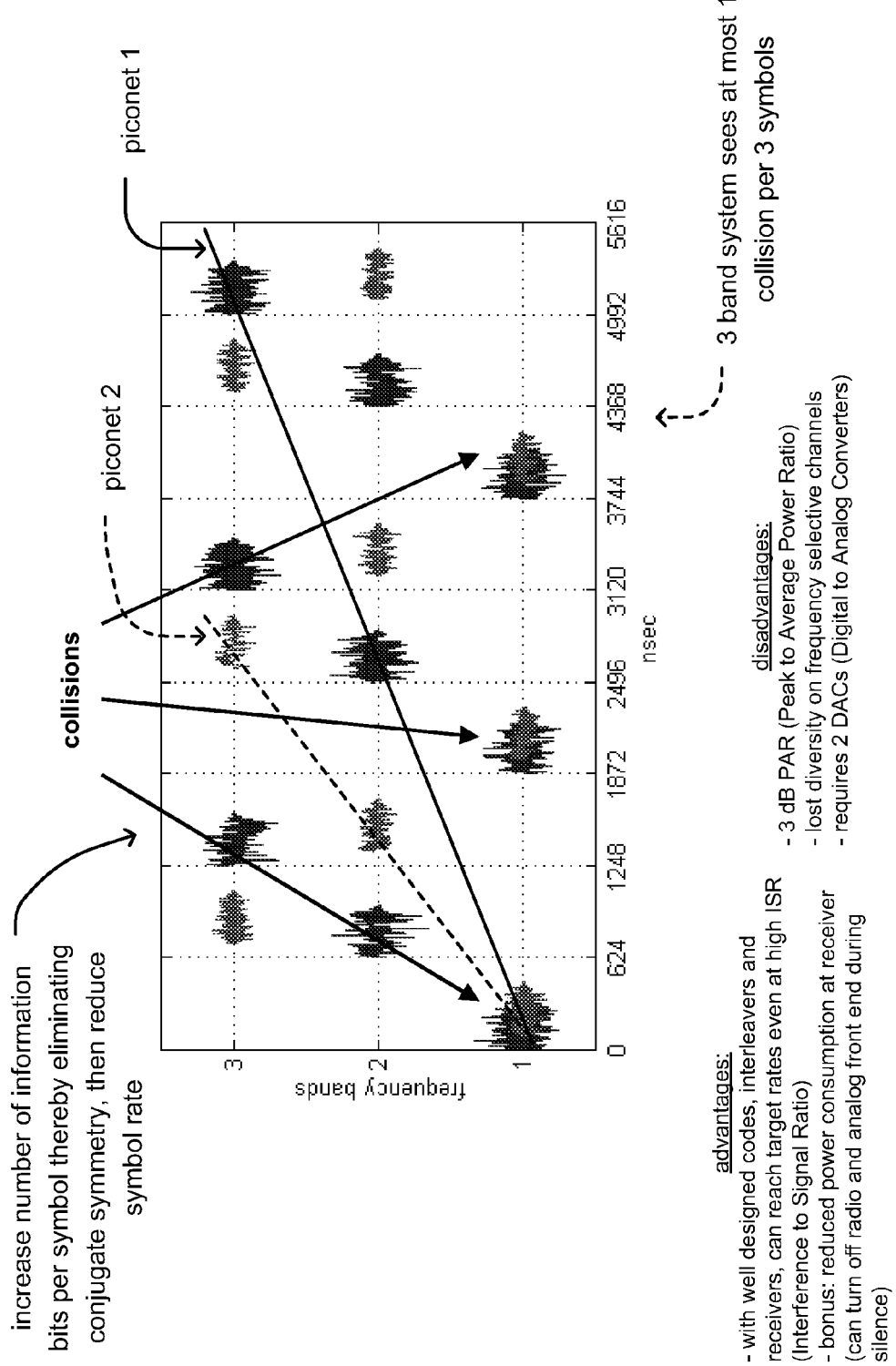
FIG. 12 is a diagram illustrating an embodiment of reduced duty cycle SH-OFDM according to the invention.

FIG. 12 is a diagram illustrating an embodiment of reduced duty cycle SH-OFDM according to the invention. This diagram shows an alternative embodiment where the number of information bits is increased per symbol thereby eliminating the conjugate symmetry; then the symbol rate is reduced. In other words, the power level of each symbol and the number of bits per tone in increased, and the rate at which symbols are sent is decreased (alternatively, the symbol rate may be decreased). As illustrated in this diagram, this reduces the collision rate by a factor of 2, so that at most 1 out of every 3 coded bits will be erased (versus 2 out 3 in the embodiment described above).

This reduced duty cycle MB-OFDM (Multi-band Orthogonal Frequency Division Multiplexing) approach described with respect to this diagram was initially introduced in another pending patent application (Ser. No. 60/488,623, filed Jul. 18, 2003 (Jul. 18, 2003), pending), and later introduced within a proposal made by the inventor [3].

This document is also publicly available via the web sites of the IEEE working groups:

[3] Eric Ojard and Jeyhan Karaoguz, Broadcom Corporation, Project: "IEEE P802.15 Working Group for Wireless Personal Area Networks (WPANs)", "Reduced Duty Cycle Multiband OFDM," 18 slides, 3 Mar. 2003.

This diagram shows an alternative embodiment where the number of information bits is increased per symbol thereby eliminating the conjugate symmetry; then, the symbol rate is reduced.

Again, as with the embodiment shown above, two (2) separate piconets (e.g., a piconet 1 and a piconet 2) each operate using different time-frequency codes, as can be seen where the frequency bands employed are changed as a function of time. During some instances, a common frequency band is employed by both piconets and undesirable symbol collisions may occur. One such effect is that, when a symbol collision occurs, the energy of such a "symbol" (really a symbol-collision-modified-symbol) will incur a greater amount of energy (or power).

Within such an embodiment, a 3 band system will see at most 1 collision per 3 symbols. This is a large improvement over the 2 collisions per 3 symbols as shown within the above embodiment.

Some of the advantages of such a system, implemented using well designed codes, include the fact that such a system can reach the target rates even at high ISR (Interference to Signal Ratio). In addition, there is bonus of such a system, in that, reduced power consumption may be supported at the receiver. The receiver can turn off its radio and analog front end during silence periods.

However, such a system may be viewed as having some disadvantages. For example, some of the disadvantages of such a system may be characterized to include a 3 dB PAR (Peak to Average Power Ratio) limitation. In addition, there is lost diversity on the frequency selective channels, and the implementation of such a system requires 2 separate DACs (Digital to Analog Converters). Moreover, this scheme suffers from 3 perhaps more significant drawbacks.

1. It gives up frequency diversity over fading channels, which results in a penalty of about 1 dB (decibels) at 110 Mbps (Mega-bits per second), and more at higher rates.

2. It increases the peak transmitted power by 3 dB, which may require a more expensive transmitter.

3. Most importantly, it only works if all piconets within the vicinity operate in this mode. Thus, it requires some mechanism to enforce the use of this mode when close SOPs are present.

While the advantages of such a system nevertheless do provide an advantage over the prior art, an even improved new mode of operates is presented herein that achieves the goals of reduced duty-cycle MB-OFDM but doesn't suffer from the above-described shortcomings.

A novel proposed solution consists of transmitting a single-carrier signal in place of the OFDM signal and also implementing a piconet operable device to include smart receiver structure functionality that is capable of estimating the interference power per bit and de-weighting the input to the Viterbi decoder accordingly. This may be viewed as being an additional mode of operation in an MB-OFDM system that may also employ the same hopping pattern and the same RF architecture.

Referring to FIG. 11, it can be seen that the partial collisions affect only a portion of each signal (e.g., not the entirety of the signal but only a portion). In this proposed mode of operation using the single carrier, the bits are transmitted in the time domain, so that the only bits affected by collisions are those corresponding to the portion of the signal experiencing the collision. This is a fundamental advantage to using the single carrier approach over using an OFDM approach, where the collisions are undesirably spread across all bits in the frequency-domain.

The proposed solution dramatically improves performance in the presence of close SOPs, without sacrificing frequency diversity, without increasing the peak transmitted power, and without requiring other piconets to use this mode. In addition, it offers a simple low-power transmission mode suitable for applications where the power of the transmitter must be minimized.

Certain operational characteristics of a transmitter-capable device (e.g., generically a piconet operable device) that is compatible with a receiver-capable device (e.g., again, another generically a piconet operable device) may be described below.

There are several possible good choices of operational parameters that may be selected for such a system that is built in accordance with the invention. Some of these are described here. The current MB-OFDM proposal uses an IFFT (Inverse Fast Fourier Transform) output sampling rate of 528 MHz. For synergy with the MB-OFDM components, it is easiest to use a symbol rate which is an integer fraction of the IFFT output sampling rate.

As such, one good choice of parameters would be as follows:

Symbol Rate=528/3=176 MHz (Mega-Hertz).
QPSK (Quadrature Phase Shift Key) modulation.
Rate ⅓ convolutional code: G=[117 155 127].
Data rate=176 MHz*2/3=117.33 MHz.

Because this symbol rate is less than ½ the bandwidth of the transmitted signal, it results in a frequency-diverse signal (as described in another patent having common inventorship as the present patent application). In other words, the same information is transmitted independently in at least 2 frequency bands spaced 176 MHz apart. This spacing is larger than the coherence bandwidth of the channel, so the two spectral regions experience independent fading.

The interleaver would be designed such that each output from the convolutional encoder is mapped to a different subband. This code was chosen such that if any one output stream is punctured, the resulting rate ½ code is still a strong code.

Moreover, there are several other useful choices of parameters. For any set of parameters, it is critical to design the code and the interleaver such that the code remains a strong code in the presence of erasures that any possible collision pattern can cause.

The following diagram is provided to show one type of a generic wireless communication system embodiment in which aspects of the invention may be found.

Figure 13:
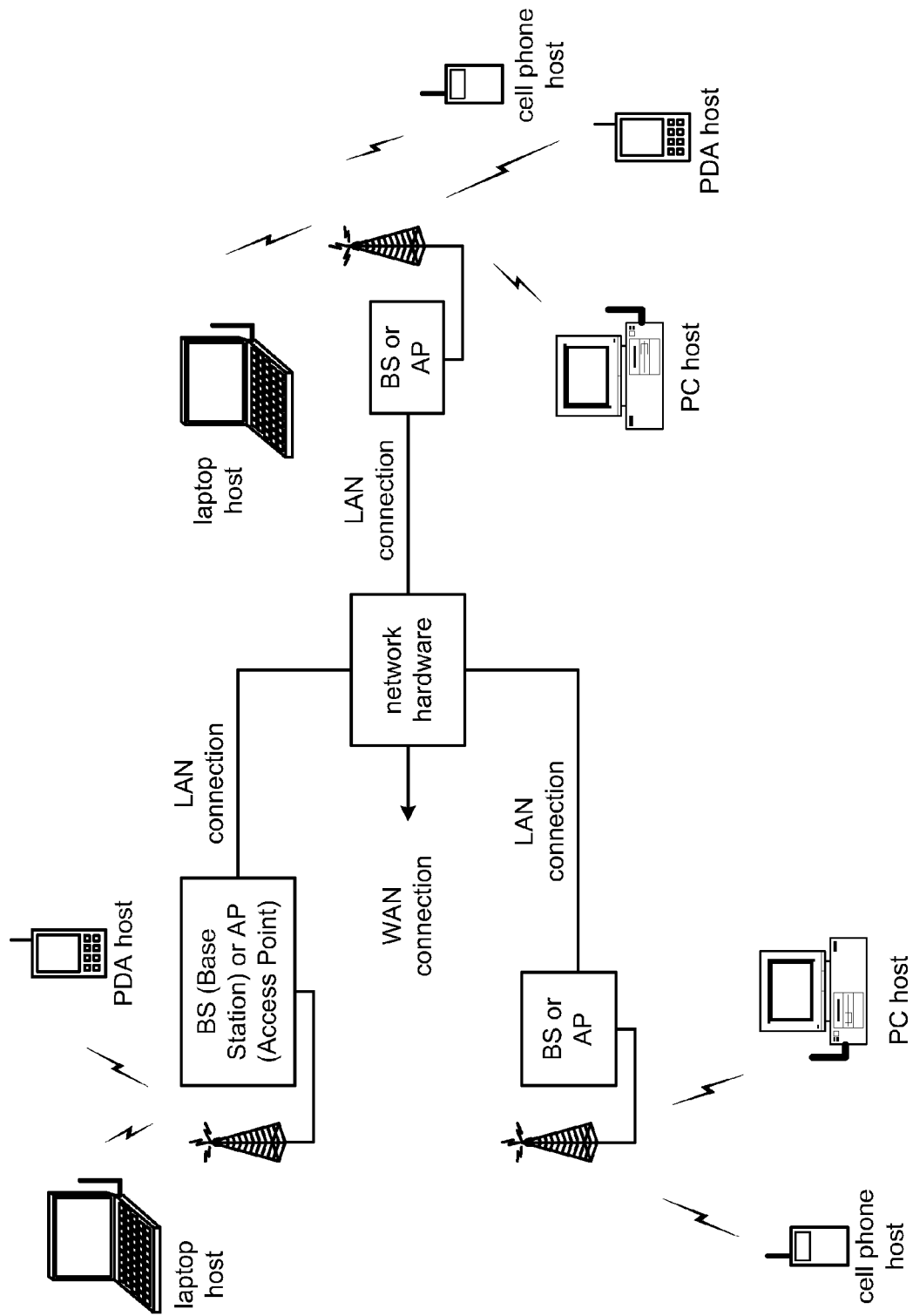
FIG. 13 is a schematic block diagram illustrating a communication system that includes a plurality of base stations and/or access points, a plurality of wireless communication devices and a network hardware component in accordance with certain aspects of the invention.

FIG. 13 is a schematic block diagram illustrating a communication system that includes a plurality of base stations and/or access points, a plurality of wireless communication devices and a network hardware component in accordance with certain aspects of the invention. The wireless communication devices may be laptop host computers, PDA (Personal Digital Assistant) hosts, PC (Personal Computer) hosts and/or cellular telephone hosts. The details of any one of these wireless communication devices is described in greater detail with reference to FIG. 14 below.

The BSs (Base Stations) or APs (Access Points) are operably coupled to the network hardware via the respective LAN (Local Area Network) connections. The network hardware, which may be a router, switch, bridge, modem, system controller, et cetera, provides a WAN (Wide Area Network) connection for the communication system. Each of the BSs or APs has an associated antenna or antenna array to communicate with the wireless communication devices in its area. Typically, the wireless communication devices register with a particular BS or AP to receive services from the communication system. For direct connections (i.e., point-to-point communications), wireless communication devices communicate directly via an allocated channel.

Typically, BSs are used for cellular telephone systems and like-type systems, while APs are used for in-home or in-building wireless networks. Regardless of the particular type of communication system, each wireless communication device includes a built-in radio and/or is coupled to a radio. The radio includes a highly linear amplifier and/or programmable multi-stage amplifier as disclosed herein to enhance performance, reduce costs, reduce size, and/or enhance broadband applications.

Figure 14:
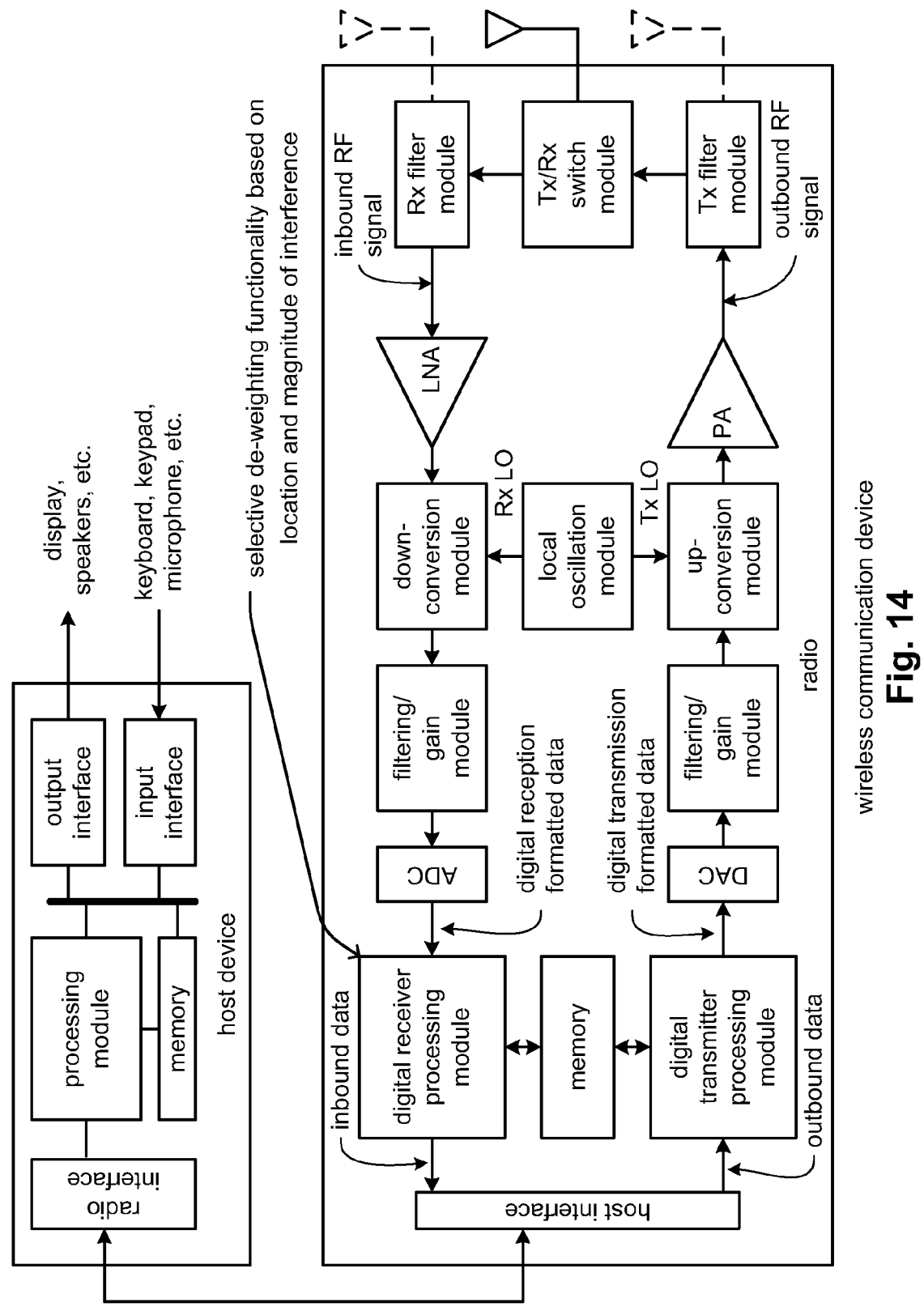
FIG. 14 is a schematic block diagram illustrating a wireless communication device that includes the host device and an associated radio in accordance with certain aspects of the invention.

FIG. 14 is a schematic block diagram illustrating a wireless communication device that includes the host device and an associated radio in accordance with certain aspects of the invention. For cellular telephone hosts, the radio is a built-in component. For PDA (Personal Digital Assistant) hosts, laptop hosts, and/or personal computer hosts, the radio may be built-in or an externally coupled component.

As illustrated, the host device includes a processing module, memory, radio interface, input interface and output interface. The processing module and memory execute the corresponding instructions that are typically done by the host device. For example, for a cellular telephone host device, the processing module performs the corresponding communication functions in accordance with a particular cellular telephone standard or protocol.

The radio interface allows data to be received from and sent to the radio. For data received from the radio (e.g., inbound data), the radio interface provides the data to the processing module for further processing and/or routing to the output interface. The output interface provides connectivity to an output display device such as a display, monitor, speakers, et cetera, such that the received data may be displayed or appropriately used. The radio interface also provides data from the processing module to the radio. The processing module may receive the outbound data from an input device such as a keyboard, keypad, microphone, et cetera, via the input interface or generate the data itself. For data received via the input interface, the processing module may perform a corresponding host function on the data and/or route it to the radio via the radio interface.

The radio includes a host interface, a digital receiver processing module, an ADC (Analog to Digital Converter), a filtering/gain module, an IF (Intermediate Frequency) mixing down conversion stage, a receiver filter, an LNA (Low Noise Amplifier), a transmitter/receiver switch, a local oscillation module, memory, a digital transmitter processing module, a DAC (Digital to Analog Converter), a filtering/gain module, an IF mixing up conversion stage, a PA (Power Amplifier), a transmitter filter module, and an antenna. The antenna may be a single antenna that is shared by the transmit and the receive paths as regulated by the Tx/Rx (Transmit/Receive) switch, or may include separate antennas for the transmit path and receive path. The antenna implementation will depend on the particular standard to which the wireless communication device is compliant.

The digital receiver processing module and the digital transmitter processing module, in combination with operational instructions stored in memory, execute digital receiver functions and digital transmitter functions, respectively. The digital receiver functions include, but are not limited to, digital IF (Intermediate Frequency) to baseband conversion, demodulation, constellation de-mapping, decoding, and/or descrambling. The digital transmitter functions include, but are not limited to, scrambling, encoding, constellation mapping, modulation, and/or digital baseband to IF conversion. The digital receiver and transmitter processing modules may be implemented using a shared processing device, individual processing devices, or a plurality of processing devices. Such a processing device may be a microprocessor, micro-controller, DSP (Digital Signal Processor), microcomputer, CPU (Central Processing Unit), FPGA (Field Programmable Gate Array), programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a ROM (Read Only Memory), RAM (Random Access Memory), volatile memory, non-volatile memory, static memory, dynamic memory, flash memory, and/or any device that stores digital information. It is noted that when either of the digital receiver processing module or the digital transmitter processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio receives outbound data from the host device via the host interface. The host interface routes the outbound data to the digital transmitter processing module, which processes the outbound data in accordance with a particular wireless communication standard (e.g., IEEE 802.11, Bluetooth®, et cetera) to produce digital transmission formatted data. The digital transmission formatted data is a digital base-band signal or a digital low IF signal, where the low IF typically will be in the frequency range of one hundred kHz (kilo-Hertz) to a few MHz (Mega-Hertz).

The DAC converts the digital transmission formatted data from the digital domain to the analog domain. The filtering/gain module filters and/or adjusts the gain of the analog signal prior to providing it to the IF mixing stage. The IF mixing stage converts the analog baseband or low IF signal into an RF signal based on a transmitter local oscillation provided by local oscillation module. The PA amplifies the RF signal to produce outbound RF signal, which is filtered by the transmitter filter module. The antenna transmits the outbound RF signal to a targeted device such as a base station, an access point and/or another wireless communication device.

The radio also receives an inbound RF signal via the antenna, which was transmitted by a BS, an AP, or another wireless communication device. The antenna provides the inbound RF signal to the receiver filter module via the Tx/Rx switch, where the Rx filter bandpass filters the inbound RF signal. The Rx filter provides the filtered RF signal to the LNA, which amplifies the signal to produce an amplified inbound RF signal. The LNA provides the amplified inbound RF signal to the IF mixing module, which directly converts the amplified inbound RF signal into an inbound low IF signal or baseband signal based on a receiver local oscillation provided by local oscillation module. The down conversion module provides the inbound low IF signal or baseband signal to the filtering/gain module. The filtering/gain module filters and/or gains the inbound low IF signal or the inbound baseband signal to produce a filtered inbound signal.

The ADC converts the filtered inbound signal from the analog domain to the digital domain to produce digital reception formatted data. In other words, the ADC samples the incoming continuous time signal thereby generating a discrete time signal (e.g., the digital reception formatted data). The digital receiver processing module decodes, descrambles, demaps, and/or demodulates the digital reception formatted data to recapture inbound data in accordance with the particular wireless communication standard being implemented by radio. The host interface provides the recaptured inbound data to the host device via the radio interface.

As one of average skill in the art will appreciate, the wireless communication device of FIG. 14 may be implemented using one or more integrated circuits. For example, the host device may be implemented on one integrated circuit, the digital receiver processing module, the digital transmitter processing module and memory may be implemented on a second integrated circuit, and the remaining components of the radio, less the antenna, may be implemented on a third integrated circuit. As an alternate example, the radio may be implemented on a single integrated circuit. As yet another example, the processing module of the host device and the digital receiver and transmitter processing modules may be a common processing device implemented on a single integrated circuit. Further, the memories of the host device and the radio may also be implemented on a single integrated circuit and/or on the same integrated circuit as the common processing modules of processing module of the host device and the digital receiver and transmitter processing module of the radio.

Figure 15:
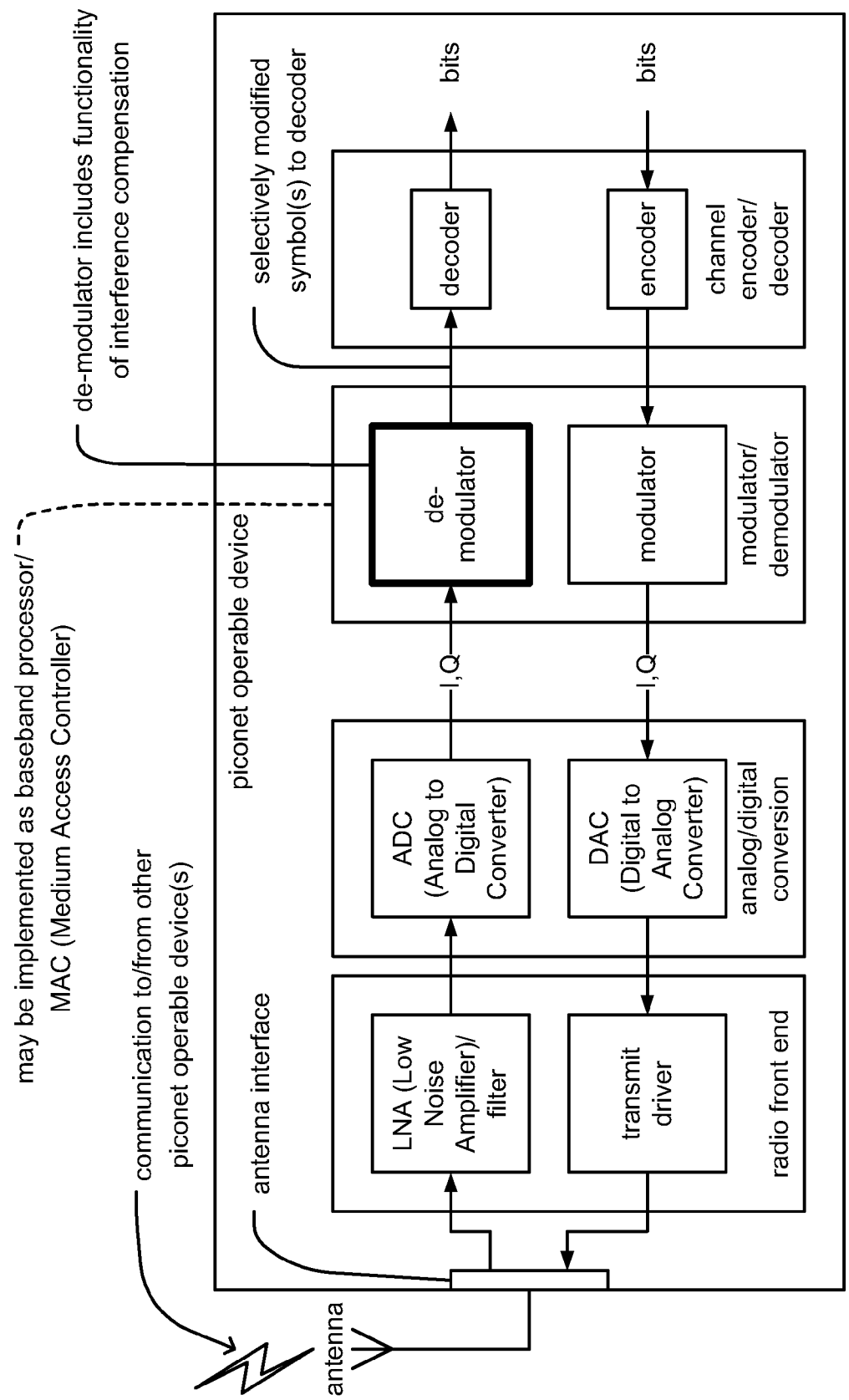
FIG. 15 is a diagram illustrating an embodiment of a piconet operable device that supports functionality of interference compensation capitalizing on structured interference according to the invention.

FIG. 15 is a diagram illustrating an embodiment of a piconet operable device that supports functionality of interference compensation according to the invention.

This embodiment of a piconet operable device includes an antenna that is operable to communicate with any 1 or more other piconet operable devices within the piconet. An antenna interface communicatively couples a signal to be transmitted from the piconet operable device or a signal received by the piconet operable device to the appropriate path (be it the transmit path or the receive path).

A radio front end includes receiver functionality and transmitter functionality. The radio front end communicatively couples to an analog/digital conversion functional block. The radio front end communicatively couples to a modulator/demodulator, and the radio front end communicatively couples to a channel encoder/decoder.

Along the Receive Path:

The receiver functionality of the front end includes a LNA (Low Noise Amplifier)/filter. The filtering performed in this receiver functionality may be viewed as the filtering that is limiting to the performance of the device, as also described above. The receiver functionality of the front end performs any down-converting that may be requiring (which may alternatively include down-converting directing from the received signal to a baseband signal). This front end may be viewed as receiving a continuous time signal, and performing appropriate filtering and any down conversion necessary to generate the baseband signal. Whichever manner of down conversion is employed, a baseband signal is output from the receiver functionality of the front end and provided to an ADC (Analog to Digital Converter) that samples the baseband signal (which is also a continuous time signal, though at the baseband frequency) and generates a discrete time signal baseband signal (e.g., a digital format of the baseband signal); the ADC also outputs the digital I, Q (In-phase, Quadrature) components of the discrete time signal baseband signal.

These I, Q components are provided to a demodulator portion of the modulator/demodulator where any modulation decoding/symbol mapping is performed where the I, Q components of the discrete time signal baseband signal. The appropriate I, Q components are then mapped to an appropriate modulation (that includes a constellation and corresponding mapping). Examples of such modulations may include BPSK (Binary Phase Shift Key), QPSK (Quadrature Phase Shift Key), 8 PSK (8 Phase Shift Key), 16 QAM (16 Quadrature Amplitude Modulation), and even higher order modulation types. In this demodulator portion of the modulator/demodulator, embedded intelligence is included to support the functionality of the interference compensation described within other of the various embodiments. For example, this may include selectively de-weighting those symbols that have undergone a symbol collision. This interference compensation may be performed by capitalizing on the inherent properties of the structured interference supported by operating the piconet in a manner according to the invention. This may also involve treating certain interference affected bits as erasures and appropriately de-weighting other interference affected bits. These selectively modified symbols are then provided to a decoder portion of the channel encoder/decoder where best estimates of the information bits contained within the received symbols are made.

Along the Transmit Path:

Somewhat analogous and opposite processing is performed in the transmit path when compared to the receive path. Information bits that are to be transmitted are encoded using an encoder of the channel encoder/decoder. These encoded bits are provided to a modulator of the modulator/demodulator where modulation encoding/symbol mapping may be performed according to the modulation of interest. These now I, Q components of the symbols are then passed to a DAC (Digital to Analog Converter) of the analog/digital conversion functional block to transform the I, Q components into a continuous time transmit signal (e.g., an analog signal). The now continuous time transmit signal to be transmitted is then passed to a transmit driver that performs any necessary up-converting/modification to the analog signal (e.g., amplification and/or filtering) to comport it to the communication channel over which the signal is to be transmitted to another piconet operable device via the antenna.

Figure 16:
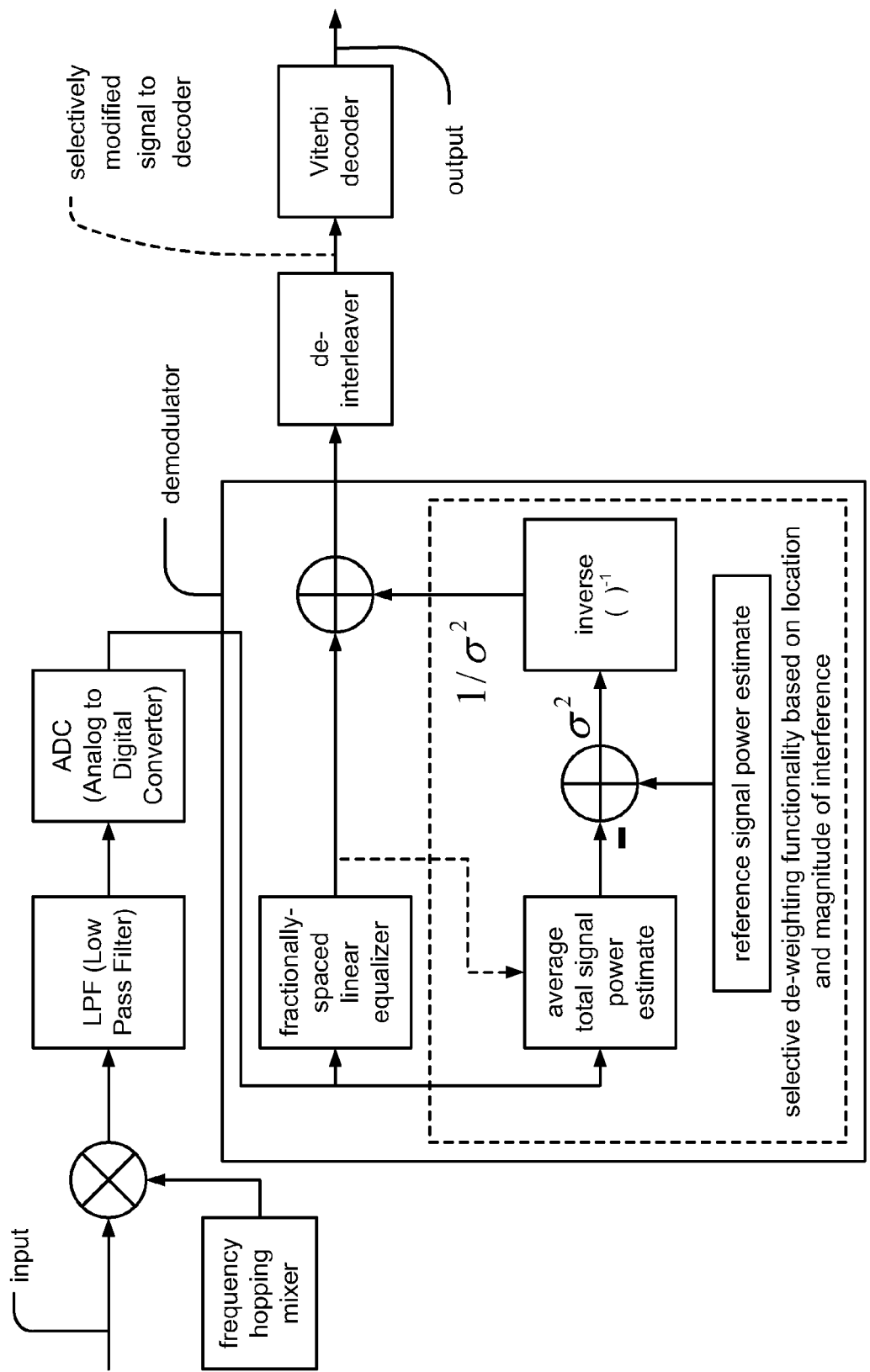
FIG. 16 is a diagram illustrating an embodiment of smart receiver structure functionality that is built according to the invention.

FIG. 16 is a diagram illustrating an embodiment of smart receiver structure functionality that is built according to the invention. This diagram describes a structure of a smart receiver that may effectuate many of the various aspects of the invention. It is noted that this smart receiver structure functionality may be found within any piconet operable device described herein including various transceivers and receivers.

The front end portion of the smart receiver structure functionality receives an input that is a continuous time signal. This received smart receiver structure functionality performs the appropriate mixing using a frequency hopping mixer that uses the same frequency hopping approach used to generate the signal at the transmit end of the communication channel. For example, this may be a educed duty cycle SH-OFDM approach as described above on an alternative embodiment. This appropriately mixed version of the received continuous time signal is provided to an ADC (Analog to Digital Converter) that samples the received continuous time signal thereby generating a discrete time signal. The ADC may also be implemented to extract the I, Q components of the discrete time signal as well. These I, Q components of the discrete time signal are provided to a demodulator. The demodulator may be implemented using various digital signal processing techniques. The demodulator employs the appropriate functionality to perform selective de-weighting based on the location and magnitude of the level (e.g., magnitude) of interference that the received signal may have experienced when being transmitted from a transmitting piconet operable device to a receiving piconet operable device including this smart receiver structure functionality.

The demodulator also includes functionality to support a fractionally-spaced linear equalizer that is operable to sum over the various spectral regions of a frequency-diverse signal that may have been transmitted from a transmitting piconet operable device. The demodulator also includes various functionality to perform the appropriate estimation and location of the level (e.g., magnitude) of collisions that may have occurred to the received signal. In other words, the smart receiver structure functionality is operable to characterize the level of the interference so that different types of interference may be dealt with differently and appropriately.

This diagram shows a very general, simplified example of the smart receiver structure functionality that is capable to support various aspects of the invention. This diagram illustrates how the input to the Viterbi decoder is de-weighted based on the estimated interference level. For very high-level interference (e.g., a first level of interference), it is sufficient to treat the affected bits as erasures, but for medium-level interference (e.g., a second level of interference), it is better to de-weight the input to the Viterbi decoder based on the magnitude of the interference.

Specifically, for optimal decoding, the LLR (log-likelihood ratio) input to the Viterbi decoder is de-weighted by multiplying the LLR by the inverse of the square of the RMS (Root Mean Square) interference level. In this illustrated embodiment, the interference level is estimated at the receiver by measuring the total instantaneous signal power, averaging the signal power, and subtracting the expected reference signal power based on the previously-obtained channel estimate or reference signal power measurement. This is shown as being all performed within the demodulator. There are many possible variations on the approach to estimate the interference power level. For one example, instead of using the average signal power that is determined directly, an alternatively embodiment of the smart receiver structure functionality may exploit predetermined knowledge of the inherent structure of the interference (in the SOPs (Simultaneously Operating Piconets) context). For another example, the smart receiver structure functionality could estimate the starting and ending points of the interference and adjust the de-weighting factor accordingly.

In addition, there are several possible equalizer structures that may be implemented in accordance with the invention (e.g., besides the fractionally-spaced linear equalizer that is illustrated). For frequency-diverse modes of operation (e.g. a transmitted signal including the same information transmitted independently over more than one frequency band), a good choice is a fractionally-spaced linear equalizer. A fractionally-spaced equalizer can optimally sum the various spectral regions of the frequency-diverse signal to allows the appropriate subsequent processing thereof.

Figure 17A:
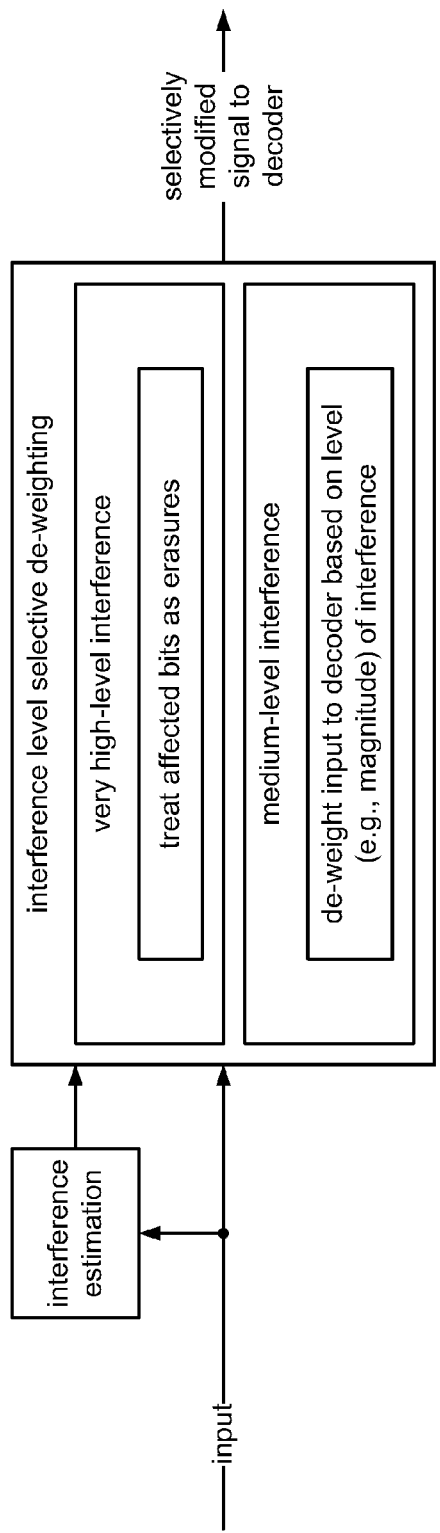
FIG. 17A is a diagram illustrating an embodiment of functionality of a smart receiver according to the invention.

FIG. 17A is a diagram illustrating an embodiment of functionality of a smart receiver according to the invention. It is noted that this functionality of a smart receiver may be included within any type of piconet operable device that can perform receiver processing including receiver and transceiver type devices. This diagram illustrates generally how an input signal undergoes interference estimation and based on that interference estimate, the input signal may be modified accordingly. For example, the interference may be categorized into at least 2 different types based on the level of the interference (or 3 different types if one considers that little or no interference is a $3^{rd}$ category).

The input to the decoder is selectively de-weighted based on the level of the estimated interference. For a very high-level of interference (e.g., a first level of interference), it is sufficient to treat the affected bits as erasures. However, for a medium-level of interference (e.g., a second level of interference), it is better to de-weight the input to the decoder based on the magnitude of the interference.

In addition, if one considers that little or no interference is a $3^{rd}$ category (e.g., a third level of interference or no interference), then for little or no interference, no de-weighting would be performed on the input to the decoder.

Figure 17B:
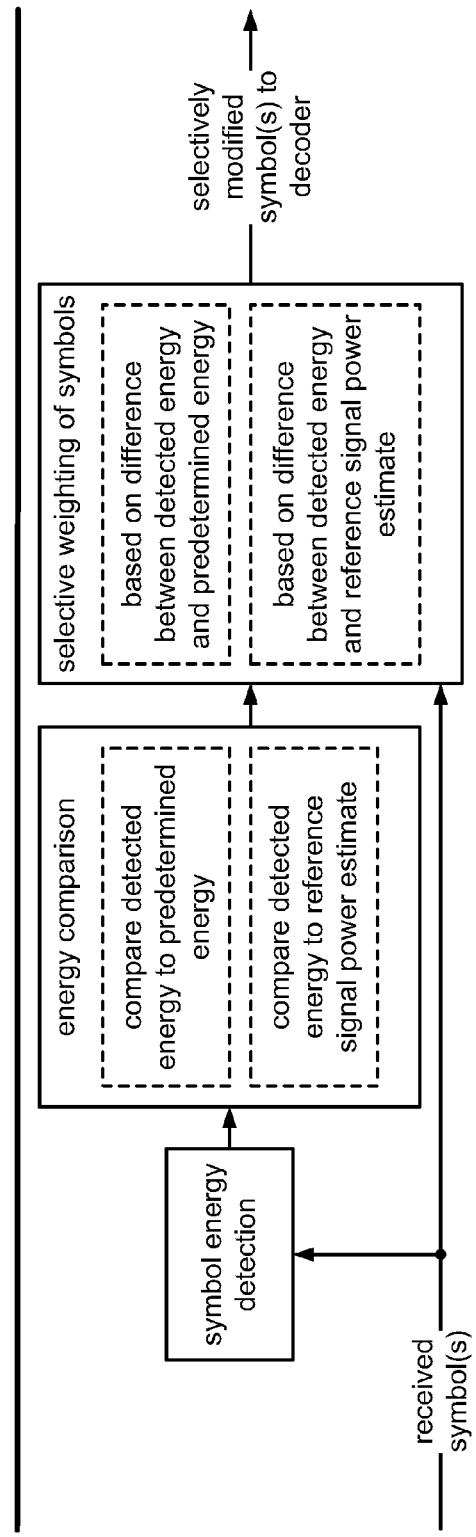
FIG. 17B is a diagram illustrating an embodiment of functionality of interference compensation capitalizing on structured interference according to the invention.

FIG. 17B is a diagram illustrating an embodiment of functionality of interference compensation capitalizing on structured interference according to the invention. This capitalizing may be viewed as being a manner in which receiver processing may be employed is performed in such a way as to operate in an intelligent manner using the intrinsic characteristics and nature of the structured type of interference that may be existent in the received signal. This may be viewed as being performed in such a way that a demodulator, within a communication device, selectively performs interference compensation of a symbol by selectively de-weighting the symbol based on structured interference existent therein. This selective de-weighting of the symbol may include performing no de-weighting in some instances while performing some de-weighting in other instances.

In this embodiment, one or more symbols are received by this functionality. A symbol energy detection functional block is operable to perform detection of the energy of received symbols.

After the symbol energy detection functional block performs the detection of the energy of a received symbol, an energy comparison functional block is operable to perform comparison of the detected energy to a predetermined energy. This predetermined energy may be viewed as an expected energy at which the received symbols should be at or is expected to be at.

When a difference between the detected energy of the symbol exceeds a threshold (that may be programmable or adaptively determined in real time in response to operating conditions or some other inputs), then this interference compensation functionality includes a functional block that is operable to perform selective weighting (as necessary) of symbols (or the individual bits of those symbols). This may be performed based on the difference between the detected energy and the predetermined energy. For example, when the energy is greater than the predetermined energy by a particular threshold, then that may be used to indicate a high likelihood of a symbol collision, and that symbol may be de-weighted before performing decoding processing of the symbol (e.g., in a decoder—one embodiment of which is a Viterbi decoder).

After the functionality of this diagram has been performed, then the selectively modified symbol(s) and/or bits of those symbols are provided to a decoder for making best estimates of the information bits contained therein. By selective modification, it is noted that some of the symbols (or some of the bits) may not undergo any de-weighting, but rather be passed to the decoder without any modification at all. However, in the presence of some interference, de-weighting may be performed to the symbol or the individual bits of those symbols.

Figure 18:
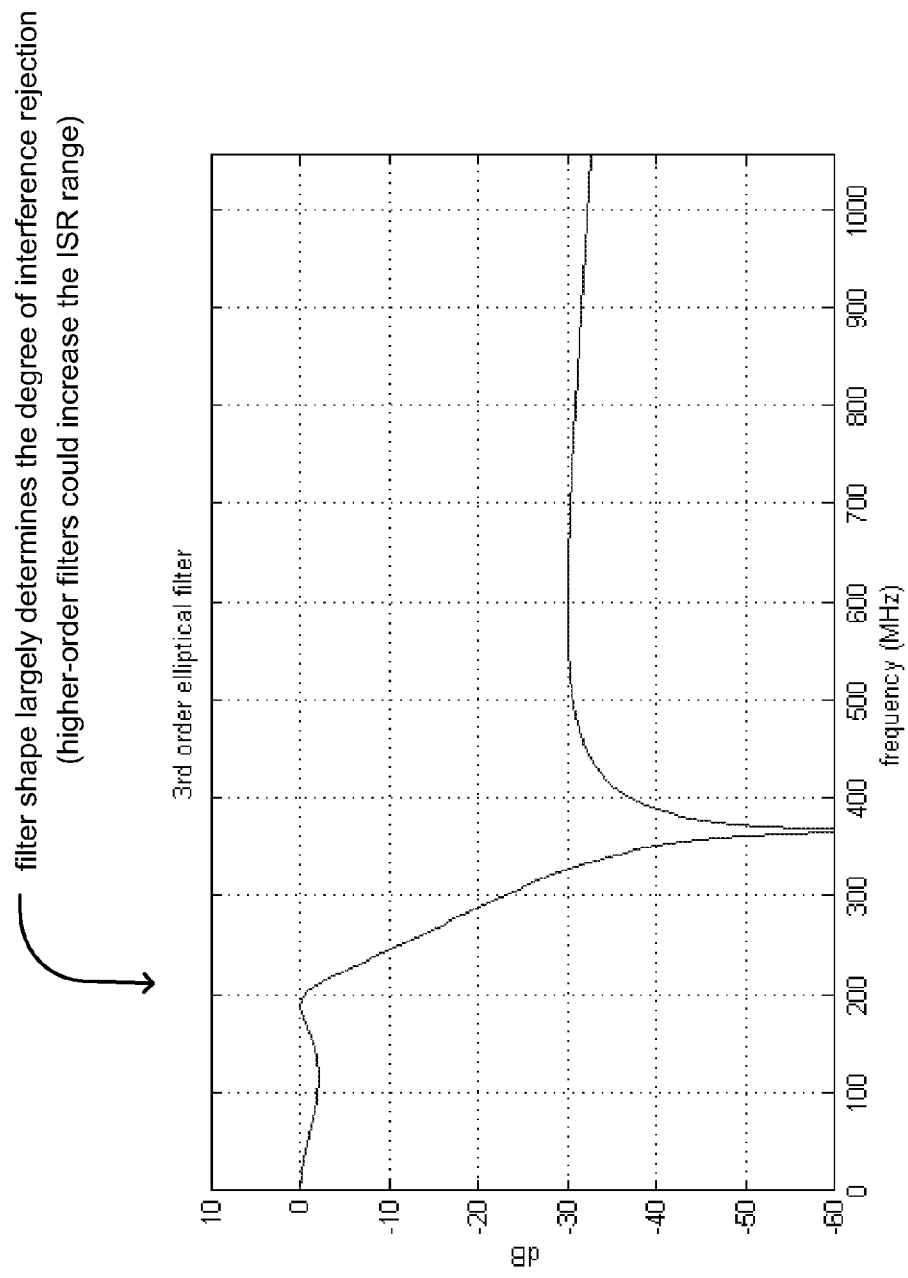
FIG. 18 is a diagram illustrating an embodiment of a $3^{rd}$ order elliptical LPF (Low Pass Filter) employed at a transmitter and a receiver (or a transceiver) according to the invention.

FIG. 18 is a diagram illustrating an embodiment of a $3^{rd}$ order elliptical LPF (Low Pass Filter) employed at a transmitter and a receiver (or a transceiver) according to the invention. Above, it is noted that the performance of a piconet operating according to the invention will typically be limited only by the out of band roll off and front end range (e.g., the radio front end and the filtering performed therein) of a device operating within such a piconet. That is to say, the filter shape largely determines the degree of interference rejection. Higher-order filters could substantially increase the ISR range of such a system.

The LPF shown in this diagram was employed. It is however noted that even better filters that may be designed can be implemented to provide for even better performance.

Figure 19:
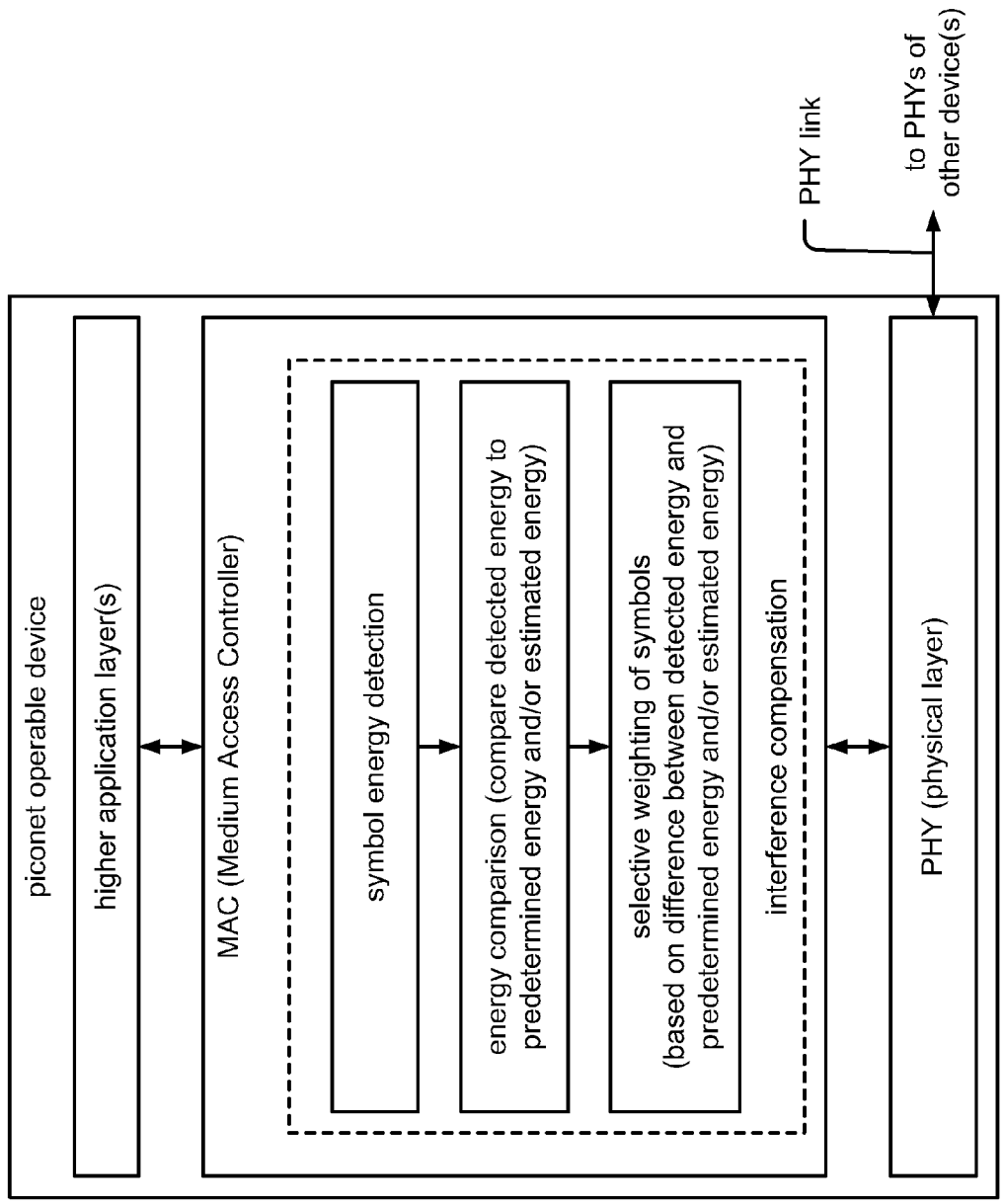
FIG. 19 is a diagram illustrating another embodiment of a piconet operable device that supports functionality of interference compensation capitalizing on structured interference (showing PHY (physical layer), MAC (Medium Access Controller), and higher protocol layers) according to the invention.

FIG. 19 is a diagram illustrating another embodiment of a piconet operable device that supports functionality of interference compensation capitalizing on structured interference (showing PHY (physical layer), MAC (Medium Access Controller), and higher protocol layers) according to the invention. A piconet operable device is included within a piconet. This piconet operable device includes a PHY (physical layer) that communicatively couples to a MAC (Medium Access Controller). The MACs of the devices may also communicatively couple to 1 or more even higher application layers within the piconet operable device. The MAC and the higher application layers may be viewed as being the higher protocol layers (e.g., above the PHY) within the respective piconet operable device. The PHY is operable to support a physical interconnection link to 1 or more other devices within a piconet.

When compared to a prior art MAC, the MAC of the piconet operable device may be viewed as being a modified protocol layer, in that, the MAC includes functionality to perform interference compensation based on the estimation of the location and level of the interference of the received signal. In an alternative embodiment, the MAC of the piconet operable device may be viewed as being a modified protocol layer, in that, the MAC may include functionality to perform interference compensation that capitalizes on the properties of the structured interference that may result from symbol collisions when operating using the combination of SH-OFDM and reduced PRF (Pulse Repetition Frequency) when compared to prior art piconet systems.

This interference compensation functionality is operable to perform symbol energy detection of symbols extracted from a signal received by the piconet operable device. After performing the detection of the energy of a received symbol, the detected energy is compared to a predetermined energy and/or estimated energy. When a difference between the detected of the symbol exceeds a threshold (that may be programmable or adaptively determined), then this interference compensation functionality may then perform selective de-weighting of symbol. In one example, when the detected energy of the symbol exceeds a predetermined threshold (e.g., when the detected energy of the symbol is greater than the predetermined energy by the threshold) then the symbol is appropriately de-weighted before being passed to a decoder for decoding processing. In another example, when the interference level is relatively much higher than the threshold, then the interference affected bits may be treated as erasures.

FIG. 20, FIG. 21, FIG. 22, and FIG. 23 are flowcharts illustrating various embodiments of methods for receive processing in a piconet operable device according to the invention.

Figure 20:
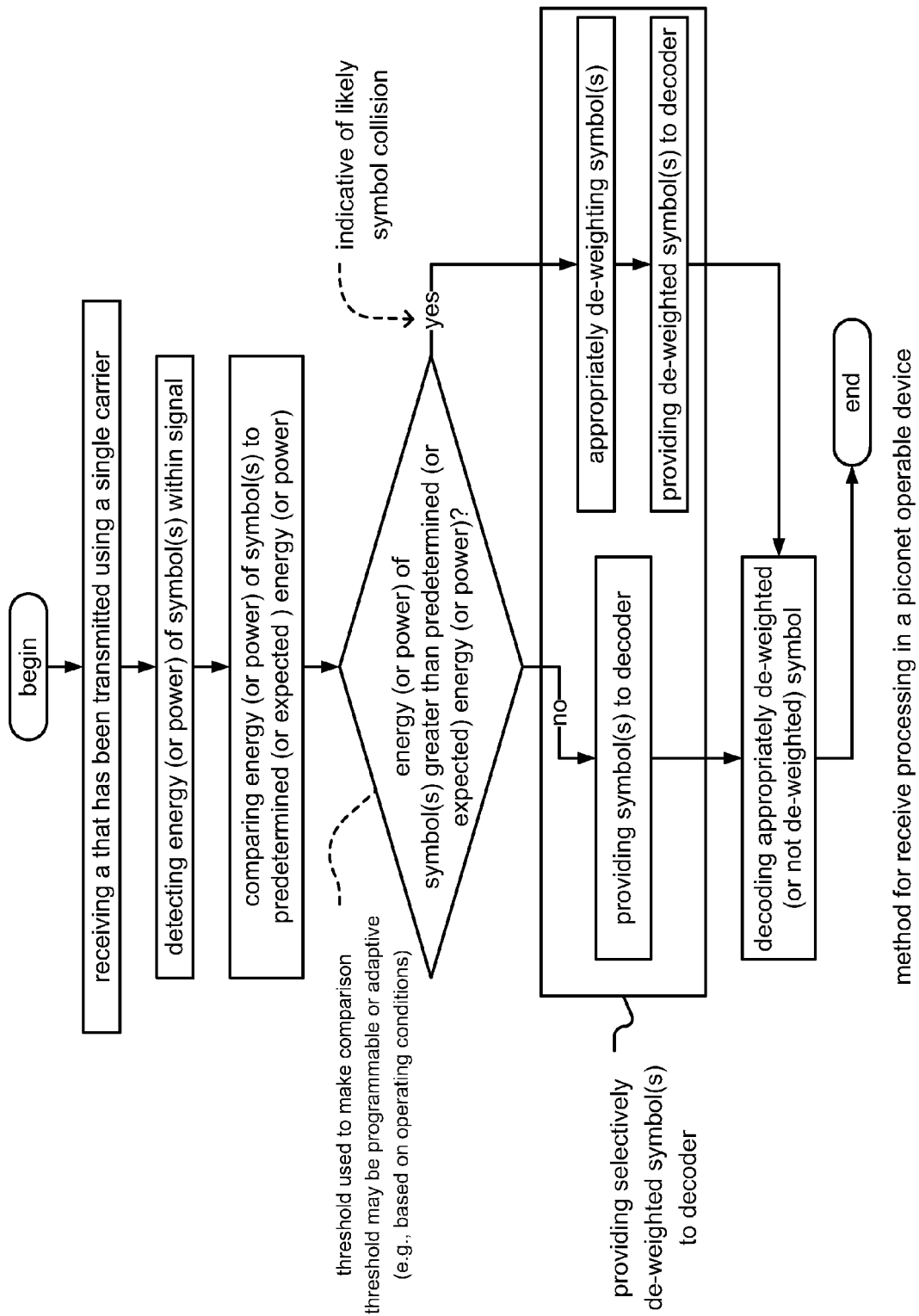
FIG. 20, FIG. 21, FIG. 22, and FIG. 23 are flowcharts illustrating various embodiments of methods for receive processing in a piconet operable device according to the invention.

Referring to the FIG. 20, the method involves receiving a signal that has been transmitted using a single carrier (e.g., single carrier frequency). Then, the method involves detecting an energy (or a power) of 1 or more symbol(s) within signal. Then, the method involves comparing the energy (or the power) of 1 or more symbol(s) to a predetermined (or an expected) energy (or power).

Then, a decision is made. It is then determined whether the energy (or the power) of the 1 or more symbol(s) is greater than the predetermined (or the expected) energy (or power). A threshold may be used to make this comparison, and the threshold may be programmable or adaptive (e.g., based on operating conditions or some other operational parameter).

If the energy (or the power) of the 1 or more symbol(s) is greater than the predetermined (or the expected) energy (or power), then this is indicative of a likely symbol collision. The symbol's energy (or power) is appropriately de-weighted, and that de-weighted symbol is then provided to a decoder for decoder processing. However, if the energy (or the power) of the 1 or more symbol(s) is not greater than the predetermined (or the expected) energy (or power), then the method involves providing the symbol(s) to decoder for decoder processing.

This providing of the either the de-weighted symbols or the un-modified symbols to the decoder for decoder processing may be viewed as being providing selectively weighted symbol(s) to decoder. That is to say, some of the symbols are de-weighted and some are not (hence, the term selectively de-weighted symbols). The method then involves decoding the de-weighted symbol or the unmodified symbol to make best estimates of at least one information bit contained within the originally received symbol.

Figure 21:
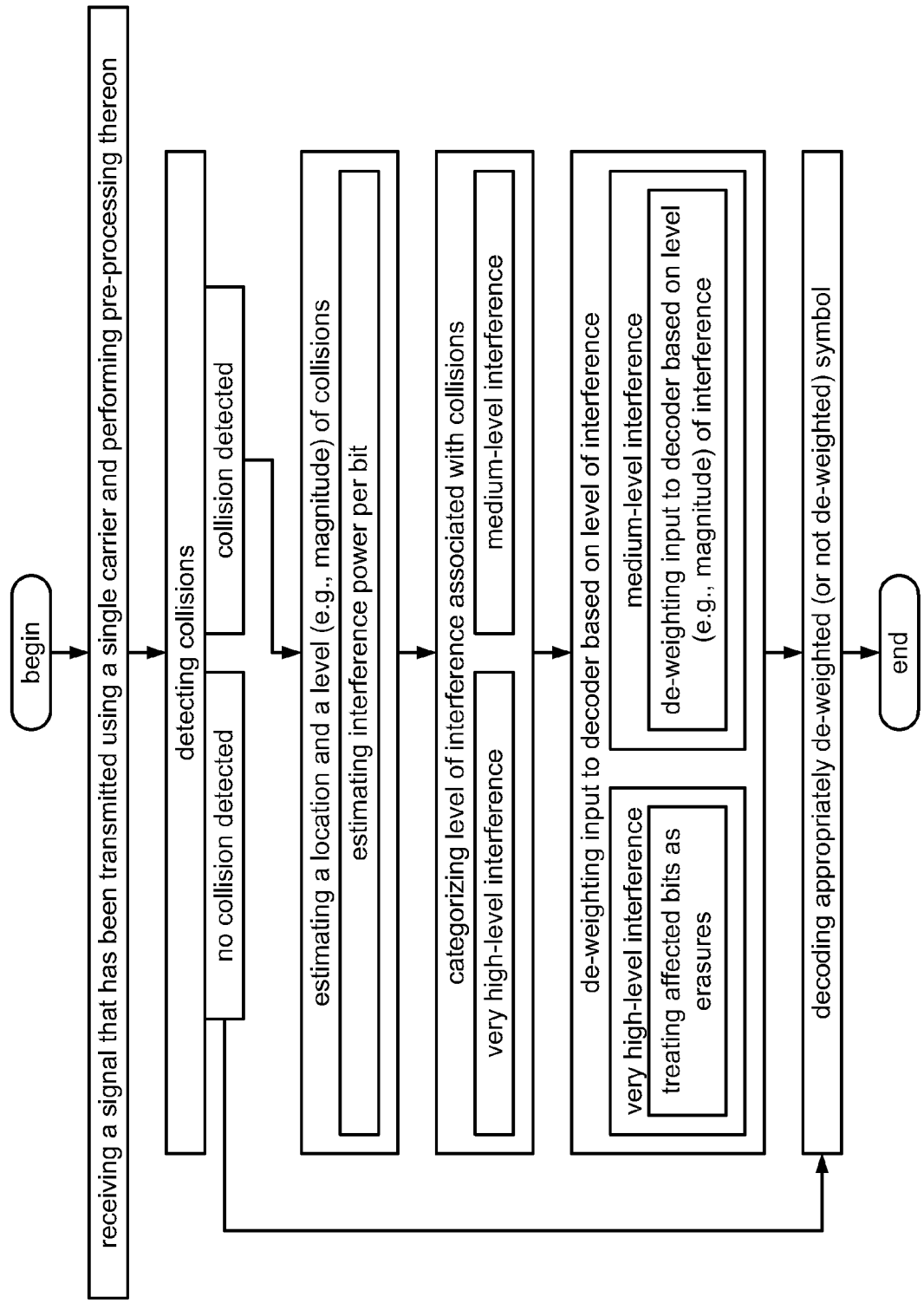

Referring to the FIG. 21, the method involves receiving a signal that has been transmitted using a single carrier and performing pre-processing thereon. The method then involves detecting collisions within that received and pre-processed signal. When no collision is detected in the received and pre-processed signal, then the received and pre-processed signal is provided to a decoder to perform decoding to make best estimates of at least one information bit contained therein.

However, when a collision is detected in the received and pre-processed signal, then the method involves estimating a location and a level (e.g., magnitude) of those one or more collisions. This may involve also estimating the interference power per bit of the symbols that have been extracted from that signal during pre-processing. The method then involves categorizing the level of interference associated with collisions. This categorization may be viewed as being into a first level of interference (very high-level interference) and a second level of interference (medium-level interference).

The method then involves de-weighting the input to decoder based on level of that categorized interference. Two different de-weighting factors may be employed based on the level of interference that has been detected and categorized. For example, when the difference between the energy of the symbol and the predetermined energy level exceeds a first threshold, then the method may involve selectively de-weighting the symbol according to a first de-weighting factor and providing the de-weighted symbol to a decoder for subsequent decoding. When the difference between the energy of the symbol and the predetermined energy level exceeds a second threshold, then the method may involve selectively de-weighting the symbol according to a second de-weighting factor and providing the de-weighted symbol (according to this different de-weighting factor) to the decoder for subsequent decoding. When the difference between the energy of the symbol and the predetermined energy level does not exceed any threshold, the method may simply involve providing the symbol to the decoder. Moreover, the method may specifically treat these various degrees of interference independently. For example, for the first level of interference (very high-level interference), the method involves treating the affected bits as erasures. For the second level of interference (medium-level interference), the method involves de-weighting input to decoder based on the level (e.g., magnitude) of that interference. It is note that for the second level of interference (medium-level interference), the degree of de-weighting is performance based on the relative degree of that interference (e.g., based on the estimate of the interference). But when the level of interference exceeds a relatively high threshold (which may be selected by a user) such as the first level of interference (very high-level interference), those affected bits are simply treated as erasures and not appropriately de-weighted.

Figure 22:
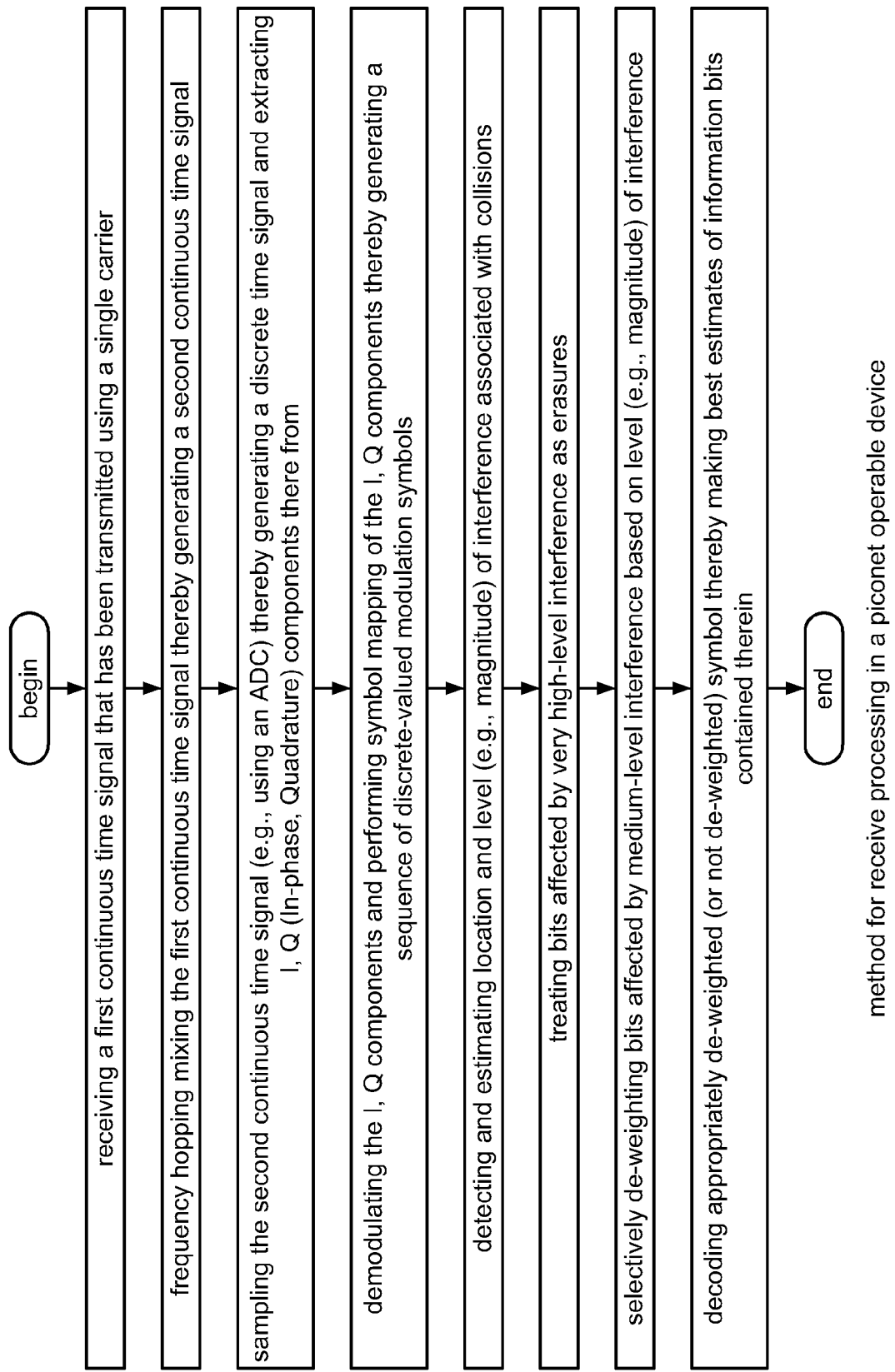

Referring to the FIG. 22, the method involves receiving a first continuous time signal that has been transmitted using a single carrier. The method then involves frequency hopping mixing the first continuous time signal thereby generating a second continuous time signal. This is performed in accordance with the manner in which a transmitted signal was frequency hopping mixed at a transmit end of a communication channel. The method then involves sampling the second continuous time signal (e.g., using an ADC) thereby generating a discrete time signal and extracting I, Q (In-phase, Quadrature) components there from. The method then involves demodulating the I, Q components and performing symbol mapping of the I, Q components thereby generating a sequence of discrete-valued modulation symbols. The method then involves detecting and estimating the location and the level (e.g., magnitude) of interference associated with collisions. The method then involves treating bits affected by very high-level interference as erasures. The method then involves selectively de-weighting bits affected by medium-level interference based on level (e.g., magnitude) of interference. The method then involves de-interleaving de-weighted LLR. The method then involves decoding the appropriately de-interleaving de-weighted LLR thereby making best estimates of information bits contained therein.

Figure 23:
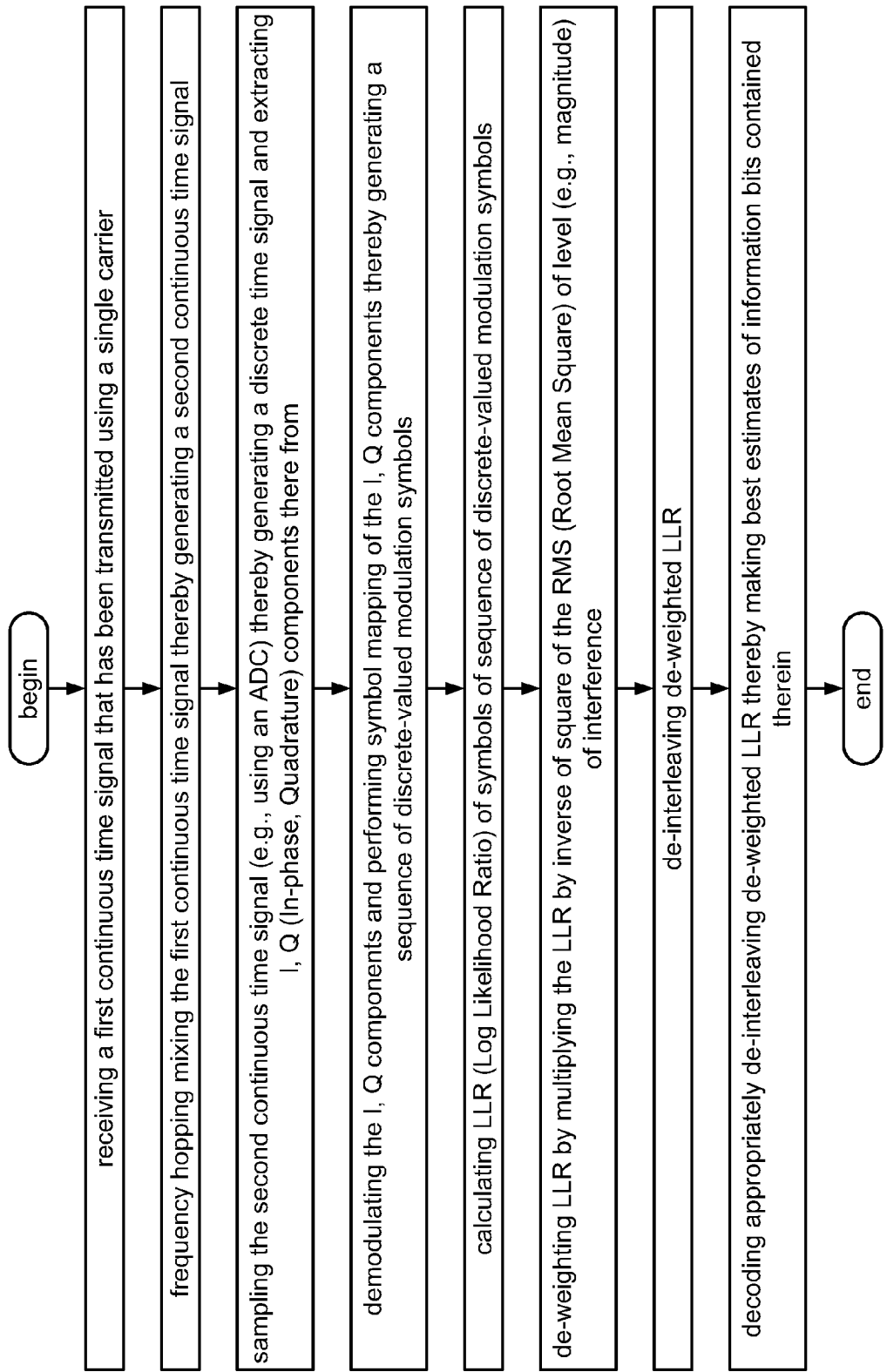

Referring to the FIG. 23, the method involves receiving a first continuous time signal that has been transmitted using a single carrier. The method then involves frequency hopping mixing the first continuous time signal thereby generating a second continuous time signal. The method then involves sampling the second continuous time signal (e.g., using an ADC) thereby generating a discrete time signal and extracting I, Q (In-phase, Quadrature) components there from. The method then involves demodulating the I, Q components and performing symbol mapping of the I, Q components thereby generating a sequence of discrete-valued modulation symbols. The method then involves calculating LLR (Log Likelihood Ratio) of symbols of sequence of discrete-valued modulation symbols. The method then involves de-weighting LLR by multiplying the LLR by inverse of square of the RMS (Root Mean Square) of level (e.g., magnitude) of interference. The method then involves de-interleaving de-weighted LLR. The method then involves decoding appropriately de-interleaving de-weighted LLR thereby making best estimates of information bits contained therein.

As mentioned above, there are many possible variations on approached and methods to estimate the interference power level. Some of these possible approaches are illustrated in the following diagrams and described below.

FIG. 24A, FIG. 24B, and FIG. 24C are flowcharts illustrating various embodiments of methods for estimating a level (e.g., magnitude) of interference of a signal for use in performing interference compensation according to the invention.

Referring to the FIG. 24A, the method involves measuring total instantaneous power. The method then involves averaging signal power. The method then involves subtracting expected signal power (based on previously-obtained channel estimate or reference signal power measurement) from the average signal power thereby generating de-weighting factor that is used in performing interference compensation.

Referring to the FIG. 24B, the method involves estimating starting and ending points of interference. The method then involves adjusting the de-weighting factor based on duration and magnitude of interference. This is a relatively easier approach to estimating a level of interference of a signal for use in performing interference compensation compared to the approach described just above.

Referring to the FIG. 24C, the method is a one step method approach that involves estimating the level (e.g., magnitude) of interference based on prior knowledge of structured nature of the interference itself. As described above in various embodiments, the manner in which the various SOPs (Simultaneously Operating Piconets) operate using frequency hopping approaches, the manner and type of interference they may experience can exhibit a "structured" type nature. Knowledge of this can be used to estimate the level and location of the interference within a signal received by a piconet operable device.

This is a completely straight-forward approach to estimating a level of interference of a signal for use in performing interference compensation.

It is also noted that various methods may be performed, in accordance with the invention, in a manner similar to the operation and functionality of the various system and/or apparatus embodiments described above. In addition, such methods may be viewed as being performed within any of the appropriate system and/or apparatus embodiments (communication systems, communication transmitters, communication receivers, communication transceivers, and/or functionality described therein) that are described above without departing from the scope and spirit of the invention.

The proposed systems and methods provide for a much improved performance when compared to any of the current proposals in the context of SOPs within relatively close proximity with one another. For example, in a 3-band system with 2 SOPs using different hopping sequences, one out of every three bits may be erased. In a 7-band system with 4 SOPs, three out of seven bits may be erased. It is critical to choose codes and interleavers such that after collisions, the surviving bits still employ a strong code. These effects are described in greater detail within the reference [3] mentioned above.

When compared to the prior art approaches to deal with interference generated by SOPs within relatively close proximity with one another, the proposed system dramatically improves performance in the presence of close SOPs, without sacrificing frequency diversity, without increasing the peak transmitted power, and without requiring other piconets to use this mode. In addition, it offers a simple low-power transmission mode suitable for applications where the power of the transmitter must be minimized.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
   an interference estimation module implemented to:
     detect whether or not a first symbol, included in a received signal, has collided with a second symbol; and
     when it is detected that the first symbol has collided with the second symbol, the interference estimation module associates a level of interference with the first symbol; and
   an interference level selective de-weighting module implemented to:
     perform de-weighting of the first symbol when the level of interference is within a first range of interference and output the de-weighted first symbol;
     treat an interference-affected bit of the first symbol as an erasure when the level of interference is within a second range of interference and output the first symbol that includes the erasure; and
     output the first symbol when the interference estimation module fails to detect that the first symbol has collided with the second symbol.

2. The apparatus of claim 1, wherein:
   the second range of interference is a relatively higher range of interference than the first range of interference.

3. The apparatus of claim 1, wherein:
   the interference estimation module determines an energy of the first symbol and employs the determined energy of the first symbol to detect whether or not the first symbol has collided with the second symbol.

4. The apparatus of claim 1, wherein:
   the interference estimation module determines an energy of the first symbol and employs the determined energy of the first symbol to detect whether or not the first symbol has collided with the second symbol; and
   the interference estimation module compares the determined energy to at least one of a predetermined energy and a reference signal power estimate.

5. The apparatus of claim 1, wherein:
   the first symbol is transmitted from a first piconet operable device that operates within a first piconet;
   the second symbol is transmitted from a second piconet operable device that operates within a second piconet; and
   the first piconet and the second piconet have a region of overlap.

6. The apparatus of claim 4, wherein:
   symbols within the first piconet and the second piconet occur according to a structured interference pattern.

7. The apparatus of claim 1, further comprising:
   a decoder implemented to receive the de-weighted first symbol, the first symbol that includes the erasure, or the first symbol; and wherein:
   the decoder processes the de-weighted first symbol, the first symbol that includes the erasure, or the first symbol to make an estimate of at least one bit encoded within the first symbol.

8. The apparatus of claim 1, wherein:
   the de-weighting of the first symbol when the level of interference is within the first range of interference is performed using a first de-weighting factor; and
   the interference level selective de-weighting module is implemented to perform de-weighting of the first symbol using a second de-weighting factor when the level of interference is within a third range of interference.

9. The apparatus of claim 1, wherein:
   the interference estimation module is implemented to characterize interference associated with the first symbol as at least one of correlated interference, White-noise-like interference, structured interference, and orthogonal interference.

10. The apparatus of claim 1, wherein:
    the apparatus is implemented as a baseband processor/MAC (Medium Access Controller) or a demodulator within a communication device.

11. The apparatus of claim 1, wherein:
    the apparatus is a wireless communication device.

12. An apparatus, comprising:
    an interference estimation module implemented to:
      detect whether or not a first symbol, included in a received signal, has collided with a second symbol; and
      when it is detected that the first symbol has collided with the second symbol, the interference estimation module associates a level of interference with the first symbol; and
    an interference level selective de-weighting module implemented to:
      perform de-weighting of the first symbol when the level of interference is within a first range of interference and output the de-weighted first symbol;
      treat an interference-affected bit of the first symbol as an erasure when the level of interference is within a second range of interference and output the first symbol that includes the erasure; and
      output the first symbol when the interference estimation module fails to detect that the first symbol has collided with the second symbol; and wherein:
    the second range of interference is a relatively higher range of interference than the first range of interference;
    the de-weighting of the first symbol when the level of interference is within the first range of interference is performed using a first de-weighting factor; and
    the interference level selective de-weighting module is implemented to perform de-weighting of the first symbol using a second de-weighting factor when the level of interference is within a third range of interference.

13. The apparatus of claim 12, wherein:
    the interference estimation module determines an energy of the first symbol and employs the determined energy of the first symbol to detect whether or not the first symbol has collided with the second symbol.

14. The apparatus of claim 12, wherein:
    the interference estimation module determines an energy of the first symbol and employs the determined energy of the first symbol to detect whether or not the first symbol has collided with the second symbol; and the interference estimation module compares the determined energy to at least one of a predetermined energy and a reference signal power estimate.

15. The apparatus of claim 12, further comprising:

a decoder implemented to receive the de-weighted first symbol, the first symbol that includes the erasure, or the first symbol; and wherein:

the decoder processes the de-weighted first symbol, the first symbol that includes the erasure, or the first symbol to make an estimate of at least one bit encoded within the first symbol.

16. The apparatus of claim 12, wherein:

the apparatus is implemented as a baseband processor/MAC (Medium Access Controller) or a demodulator within a communication device.

17. The apparatus of claim 12, wherein:

the apparatus is a wireless communication device.

18. A method, comprising:

detecting whether or not a first symbol, included in a received signal, has collided with a second symbol;

when it is detected that the first symbol has collided with the second symbol, associating a level of interference with the first symbol;

performing de-weighting of the first symbol when the level of interference is within a first range of interference using a first de-weighting factor and outputting the de-weighted first symbol;

treating an interference-affected bit of the first symbol as an erasure when the level of interference is within a second range of interference and outputting the first symbol that includes the erasure, wherein the second range of interference is a relatively higher range of interference than the first range of interference;

performing de-weighting of the first symbol when the level of interference is within a third range of interference using a second de-weighting factor and outputting the de-weighted first symbol;

outputting the first symbol when no collision between the first symbol and the second symbol is detected; and decoding the de-weighted first symbol, the first symbol that includes the erasure, or the first symbol to make an estimate of at least one bit encoded within the first symbol.

19. The method of claim 18, further comprising:

determining an energy of the first symbol and employing the determined energy of the first symbol to detect whether or not the first symbol has collided with the second symbol; and comparing the determined energy to at least one of a predetermined energy and a reference signal power estimate.

20. The method of claim 18, wherein:

the method is performed within a wireless communication device.

* * * * *